United States Patent
Manolakos et al.

(10) Patent No.: US 11,927,684 B2
(45) Date of Patent: *Mar. 12, 2024

(54) POSITIONING REFERENCE SIGNAL MUTING PATTERNS WITH SEMI-PERSISTENT OR APERIODIC TIMING BEHAVIOR

(71) Applicant: QUALCOMM Incorporated, San Diego, CA (US)

(72) Inventors: Alexandros Manolakos, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,440

(22) Filed: May 1, 2023

(65) Prior Publication Data

US 2023/0266427 A1    Aug. 24, 2023

Related U.S. Application Data

(63) Continuation of application No. 16/733,213, filed on Jan. 2, 2020, now Pat. No. 11,808,871.

(30) Foreign Application Priority Data

Jan. 10, 2019   (GR) .............................. 20190100012

(51) Int. Cl.
*G01S 5/02* (2010.01)
*H04L 5/00* (2006.01)
(Continued)

(52) U.S. Cl.
CPC .......... *G01S 5/0236* (2013.01); *H04L 5/0051* (2013.01); *H04L 5/10* (2013.01);
(Continued)

(58) Field of Classification Search
None
See application file for complete search history.

(56) References Cited

U.S. PATENT DOCUMENTS 10,111,213 B2    10/2018  Lee et al.
2014/0036849 A1   2/2014  Ribeiro et al.
(Continued)

FOREIGN PATENT DOCUMENTS

CN    102884749 A    1/2013
CN    106664591 A    5/2017

OTHER PUBLICATIONS

Taiwan Search Report—TW109100799—TIPO—dated May 6, 2023.
(Continued)

*Primary Examiner* — Srinivasa R Reddivalam
(74) *Attorney, Agent, or Firm* — Muncy, Geissler, Olds & Lowe, P.C./Qualcomm

(57) ABSTRACT

Disclosed are techniques for muting positioning reference signals. In aspects, a location server sends, to a user equipment (UE), a plurality of positioning reference signal configurations and one or more positioning reference signal muting configurations associated with a transmission-reception point (TRP) identifier (ID) and/or a positioning reference signal ID. A first TRP sends, to the UE, a command triggering at least one positioning reference signal muting configuration, wherein the triggered positioning reference signal muting configuration indicates that: the one or more positioning reference signals of the one or more positioning reference signal occasions of at least one positioning reference signal configuration are not being transmitted, or the
(Continued)

one or more positioning reference signals of the one or more positioning reference signal occasions of all of the plurality of positioning reference signal configurations are not being transmitted, and mutes positioning reference signals according to the triggered positioning reference signal muting configurations.

36 Claims, 14 Drawing Sheets

(51) Int. Cl.
  *H04L 5/10*   (2006.01)
  *H04L 25/02*  (2006.01)
  *H04W 64/00*  (2009.01)
  *H04W 72/23*  (2023.01)
  *H04W 76/11*  (2018.01)
  *H04W 80/02*  (2009.01)

(52) U.S. Cl.
  CPC ....... *H04L 25/0226* (2013.01); *H04W 64/003* (2013.01); *H04W 72/23* (2023.01); *H04W 76/11* (2018.02); *H04W 80/02* (2013.01)

(56) References Cited

U.S. PATENT DOCUMENTS

| | | |
|---|---|---|
| 2015/0365790 A1 | 12/2015 | Edge et al. |
| 2017/0288830 A1 | 10/2017 | Fischer |
| 2018/0217228 A1 | 8/2018 | Edge et al. |
| 2020/0225309 A1 | 7/2020 | Manolakos |
| 2021/0352613 A1 | 11/2021 | Yoon et al. |
| 2022/0026517 A1 | 1/2022 | Hasegawa et al. |

OTHER PUBLICATIONS

International Preliminary Report on Patentability—PCT/US2020/012226, The International Bureau of WIPO—Geneva, Switzerland, dated Jul. 22, 2021.
International Search Report and Written Opinion—PCT/US2020/012226—ISA/EPO—dated Apr. 17, 2020.
Mitsubishi Electric: "Views on NR Positioning Techniques," 3GPP Draft, 3GPP TSG RAN WG1 Meeting #95, R1-1813386-RAN195_Positioning_A, 3rd Generation Partnership Project (3GPP), Mobile Competence Centre, 650, Route Des Lucioles, F-06921, Sophia-Antipolis Cedex, France, vol. RAN WG1. No. Spokane. USA, Nov. 12, 2018-Nov. 16, 2018, Nov. 11, 2018 (Nov. 11, 2018), XP051555417, 6 pages, section 2.3. 3, p. 4.
Nokia, et al., "PRS Configuration for OTDOA Positioning in FeMTC", 3GPP Draft, 3GPP TSG RAN WG1 Meeting #87, R1-1611489, 3rd Generation Partnership Project (3GPP), Mobile Competence Centre, 650, Route Des Lucioles, F-06921, Sophia-Antipolis Cedex, France, vol. RAN WG1. No. Reno. USA, Nov. 14, 2016-Nov. 18, 2016, Nov. 13, 2016 (Nov. 13, 2016), XP051175467, 3 pages, section 1-2. 2.3, Paragraph "2 . PRS configuration for Tranmission Point" Paragraph "3. PRS connfiguration for UE".

POSITIONING REFERENCE SIGNAL MUTING PATTERNS WITH SEMI-PERSISTENT OR APERIODIC TIMING BEHAVIOR

CROSS-REFERENCE TO RELATED APPLICATIONS

The present Application for Patent is a continuation application of U.S. application Ser. No. 16/733,213, entitled "POSITIONING REFERENCE SIGNAL MUTING PATTERNS WITH SEMI-PERSISTENT OR APERIODIC TIMING BEHAVIOR," filed Jan. 2, 2020, which claims priority under 35 U.S.C. § 119 to Greek Patent Application No. 20190100012, entitled "POSITIONING REFERENCE SIGNAL MUTING PATTERNS WITH SEMI-PERSISTENT OR APERIODIC TIMING BEHAVIOR," filed Jan. 10, 2019, assigned to the assignee hereof, and each of the above is expressly incorporated herein by reference in its entirety.

INTRODUCTION

Aspects of this disclosure relate generally to telecommunications, and more particularly to positioning reference signal muting patterns with semi-persistent or aperiodic timing behavior.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include code division multiple access (CDMA) systems, time division multiple access (TDMA) systems, frequency division multiple access (FDMA) systems, orthogonal frequency division multiple access (OFDMA) systems, and others. These systems are often deployed in conformity with specifications such as Long Term Evolution (LTE) and LTE Advanced (LTE-A) provided by the Third Generation Partnership Project (3GPP), Ultra Mobile Broadband (UMB) and Evolution Data Optimized (EV-DO) provided by the Third Generation Partnership Project 2 (3GPP2), WiFi (also referred to as Wi-Fi) 802.11 provided by the Institute of Electrical and Electronics Engineers (IEEE), etc.

A fifth generation mobile standard (referred to as "5G" or "New Radio" (NR)) will enable higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current LTE standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for muting of positioning reference signals performed by a first transmission-reception point (TRP) includes sending, to a user equipment (UE), on a bandwidth part of a first carrier frequency, a command triggering at least one of one or more positioning reference signal muting configurations associated with a TRP identifier (ID) and/or a positioning reference signal ID, wherein the triggered positioning reference signal muting configuration indicates that: one or more positioning reference signals of one or more positioning reference signal occasions of at least one positioning reference signal configuration of a plurality of positioning reference signal configurations in a second TRP are not being transmitted, the plurality of positioning reference signal configurations associated with the TRP ID and/or the positioning reference signal ID, or the one or more positioning reference signals of the one or more positioning reference signal occasions of all of the plurality of positioning reference signal configurations in the second TRP are not being transmitted, wherein the second TRP mutes the positioning reference signals according to the triggered positioning reference signal muting configuration.

In an aspect, a method for muting of positioning reference signals performed by a UE includes receiving, from a location server, a plurality of positioning reference signal configurations associated with a TRP ID or a positioning reference signal ID, wherein each positioning reference signal configuration of the plurality of positioning reference signal configurations specifies a periodic, semi persistent, or aperiodic pattern of one or more positioning reference signal occasions, and wherein each positioning reference signal occasion of the one or more positioning reference signal occasions specifies transmission of one or more positioning reference signals from a second TRP, receiving, from the location server, one or more positioning reference signal muting configurations associated with the TRP ID or the positioning reference signal ID, receiving, from a first TRP, on a bandwidth part of a first carrier frequency, a command triggering at least one of the one or more positioning reference signal muting configurations, determining, based at least in part on the triggered positioning reference signal muting configuration, that: the one or more positioning reference signals of the one or more positioning reference signal occasions of at least one positioning reference signal configuration of the plurality of positioning reference signal configurations of the second TRP are not being transmitted, or the one or more positioning reference signals of the one or more positioning reference signal occasions of all of the plurality of positioning reference signal configurations of the second TRP are not being transmitted, and processing the one or more positioning reference signals of the one or more positioning reference signal occasions of each of the plurality of positioning reference signal configurations based at least in part on the determination.

In an aspect, a first TRP includes a memory, at least one processor, and a communication device configured to send, to a UE, on a bandwidth part of a first carrier frequency, a command triggering at least one of one or more positioning reference signal muting configurations associated with a TRP identifier (ID) and/or a positioning reference signal ID, wherein the triggered positioning reference signal muting configuration indicates that: one or more positioning reference signals of one or more positioning reference signal occasions of at least one positioning reference signal configuration of a plurality of positioning reference signal configurations in a second TRP are not being transmitted, the plurality of positioning reference signal configurations associated with the TRP ID and/or the positioning reference signal ID, or the one or more positioning reference signals of the one or more positioning reference signal occasions of all of the plurality of positioning reference signal configurations in the second TRP are not being transmitted, wherein the second TRP mutes the positioning reference signals according to the triggered positioning reference signal muting configuration.

In an aspect, a UE includes a memory, at least one processor, and a communication device configured to receive, from a location server, a plurality of positioning reference signal configurations associated with a TRP ID or a positioning reference signal ID, wherein each positioning reference signal configuration of the plurality of positioning reference signal configurations specifies a periodic, semi persistent, or aperiodic pattern of one or more positioning reference signal occasions, and wherein each positioning reference signal occasion of the one or more positioning reference signal occasions specifies transmission of one or more positioning reference signals from a second TRP, receive, from the location server, one or more positioning reference signal muting configurations associated with the TRP ID or the positioning reference signal ID, and receive, from a first TRP, on a bandwidth part of a first carrier frequency, a command triggering at least one of the one or more positioning reference signal muting configurations, wherein the at least one processor is configured to determine, based at least in part on the triggered positioning reference signal muting configuration, that: the one or more positioning reference signals of the one or more positioning reference signal occasions of at least one positioning reference signal configuration of the plurality of positioning reference signal configurations of the second TRP are not being transmitted, or the one or more positioning reference signals of the one or more positioning reference signal occasions of all of the plurality of positioning reference signal configurations of the second TRP are not being transmitted, and process the one or more positioning reference signals of the one or more positioning reference signal occasions of each of the plurality of positioning reference signal configurations based at least in part on the determination.

In an aspect, a TRP includes means for sending, to a UE, on a bandwidth part of a first carrier frequency, a command triggering at least one of one or more positioning reference signal muting configurations associated with a TRP identifier (ID) and/or a positioning reference signal ID, wherein the triggered positioning reference signal muting configuration indicates that: one or more positioning reference signals of one or more positioning reference signal occasions of at least one positioning reference signal configuration of a plurality of positioning reference signal configurations in a second TRP are not being transmitted, the plurality of positioning reference signal configurations associated with the TRP ID and/or the positioning reference signal ID, or the one or more positioning reference signals of the one or more positioning reference signal occasions of all of the plurality of positioning reference signal configurations in the second TRP are not being transmitted, wherein the second TRP mutes the positioning reference signals according to the triggered positioning reference signal muting configuration.

In an aspect, a UE includes means for receiving, from a location server, a plurality of positioning reference signal configurations associated with a TRP ID or a positioning reference signal ID, wherein each positioning reference signal configuration of the plurality of positioning reference signal configurations specifies a periodic, semi persistent, or aperiodic pattern of one or more positioning reference signal occasions, and wherein each positioning reference signal occasion of the one or more positioning reference signal occasions specifies transmission of one or more positioning reference signals from a second TRP, means for receiving, from the location server, one or more positioning reference signal muting configurations associated with the TRP ID or the positioning reference signal ID, means for receiving, from a first TRP, on a bandwidth part of a first carrier frequency, a command triggering at least one of the one or more positioning reference signal muting configurations, means for determining based at least in part on the triggered positioning reference signal muting configuration, that: the one or more positioning reference signals of the one or more positioning reference signal occasions of at least one positioning reference signal configuration of the plurality of positioning reference signal configurations of the second TRP are not being transmitted, or the one or more positioning reference signals of the one or more positioning reference signal occasions of all of the plurality of positioning reference signal configurations of the second TRP are not being transmitted, and means for processing the one or more positioning reference signals of the one or more positioning reference signal occasions of each of the plurality of positioning reference signal configurations based at least in part on the determination.

In an aspect, a non-transitory computer-readable medium storing computer-executable instructions includes computer-executable instructions comprising at least one instruction instructing a first TRP to send, to a UE, on a bandwidth part of a first carrier frequency, a command triggering at least one of one or more positioning reference signal muting configurations associated with a TRP identifier (ID) and/or a positioning reference signal ID, wherein the triggered positioning reference signal muting configuration indicates that: one or more positioning reference signals of one or more positioning reference signal occasions of at least one positioning reference signal configuration of a plurality of positioning reference signal configurations in a second TRP are not being transmitted, the plurality of positioning reference signal configurations associated with the TRP ID and/or the positioning reference signal ID, or the one or more positioning reference signals of the one or more positioning reference signal occasions of all of the plurality of positioning reference signal configurations in the second TRP are not being transmitted, wherein the second TRP mutes the positioning reference signals according to the triggered positioning reference signal muting configuration.

In an aspect, a non-transitory computer-readable medium storing computer-executable instructions includes computer-executable instructions comprising at least one instruction instructing a UE to receive, from a location server, a plurality of positioning reference signal configurations associated with a TRP ID or a positioning reference signal ID, wherein each positioning reference signal configuration of the plurality of positioning reference signal configurations specifies a periodic, semi persistent, or aperiodic pattern of one or more positioning reference signal occasions, and wherein each positioning reference signal occasion of the one or more positioning reference signal occasions specifies transmission of one or more positioning reference signals from a second TRP, at least one instruction instructing the UE to receive, from the location server, one or more positioning reference signal muting configurations associated with the TRP ID or the positioning reference signal ID, at least one instruction instructing the UE to receive, from a first TRP, on a bandwidth part of a first carrier frequency, a command triggering at least one of the one or more positioning reference signal muting configurations, at least one instruction instructing the UE to determine, based at least in part on the triggered positioning reference signal muting configuration, that: the one or more positioning reference signals of the one or more positioning reference signal occasions of at least one positioning reference signal configuration of the plurality of positioning reference signal configurations of the second TRP are not being transmitted, or the one or more positioning reference signals of the one or more positioning reference signal occasions of all of the plurality of positioning reference signal configurations of the second TRP are not being transmitted, and at least one instruction instructing the UE to process the one or more positioning reference signals of the one or more positioning reference signal occasions of each of the plurality of positioning reference signal configurations based at least in part on the determination.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
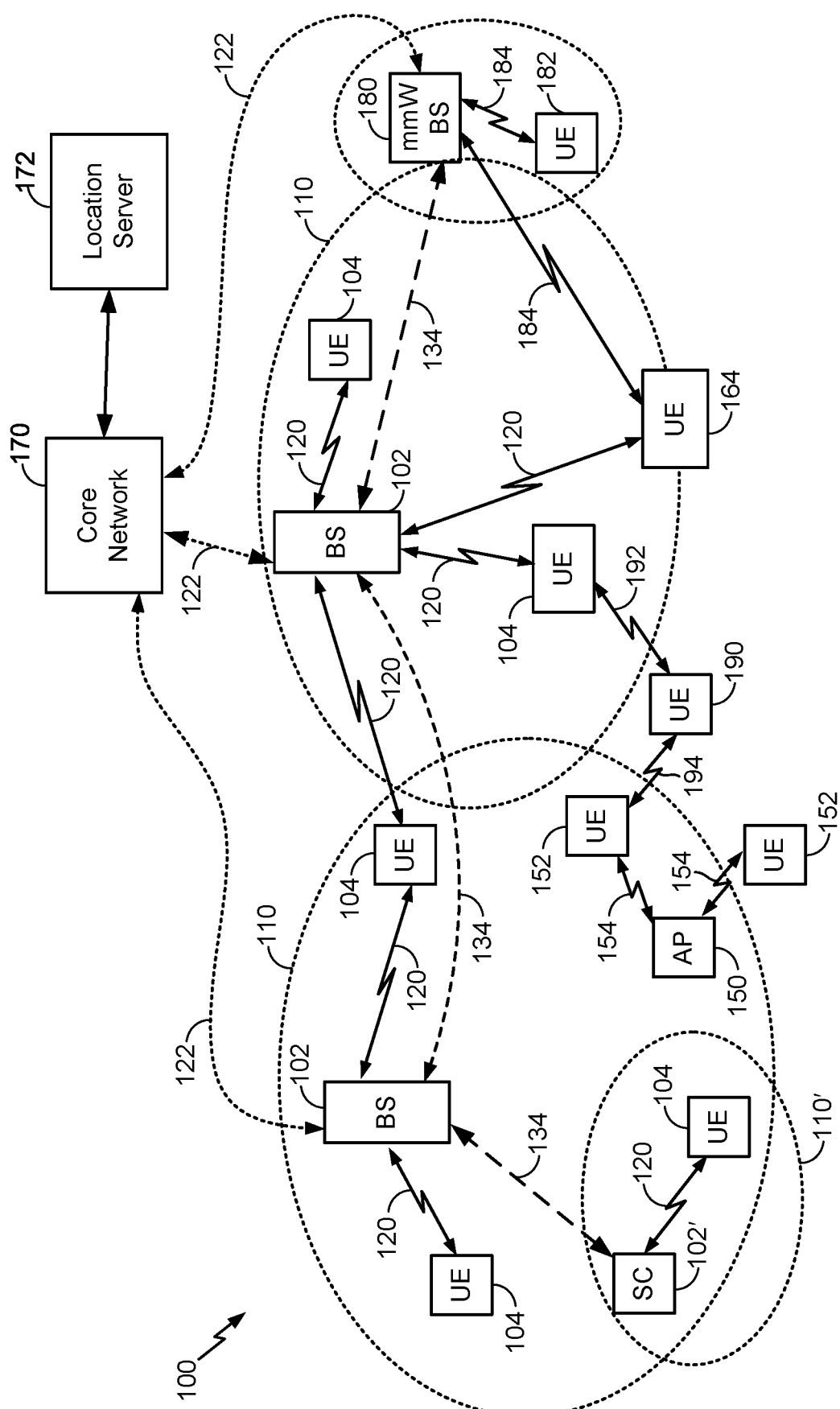
FIG. 1 illustrates an exemplary wireless communications system, according to various aspects of the disclosure.

Elements with like numbers or like labels in different figures are to be considered as corresponding to one another. Elements with a common numeric label followed by different alphabetic suffixes may correspond to different examples of a common type of element. Thus, for example, base stations 102A, 102B, 102C and 102D in FIG. 1 are all particular examples of a base station, which may be referred to as a base station 102 when all the examples 102A-110D are applicable.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof. Further, many aspects are described in terms of sequences of actions to be performed by, for example, elements of a computing device. It will be recognized that various actions described herein can be performed by specific circuits (e.g., application specific Iitegrated circuits (ASICs)), by program instructions being executed by one or more processors, or by a combination of both. In addition, for each of the aspects described herein, the corresponding form of any such aspect may be implemented as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a NR Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 102. In an aspect, one or more cells may be supported by a base station 102 in each coverage area 102. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 102.

While neighboring macro cell base station 102 geographic coverage areas 102 may partially overlap (e.g., in a handover region), some of the geographic coverage areas 102 may be substantially overlapped by a larger geographic coverage area 102. For example, a small cell base station 102' may have a coverage area 102' that substantially overlaps with the coverage area 102 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 104 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 104 may use MIMO antenna technology, including spatial multiplexing, beamforming, and/or transmit diversity. The communication links 104 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

More specifically, LBT is a mechanism by which a transmitter (e.g., a UE on the uplink or a base station on the downlink) applies CCA before using the channel/subband. Thus, before transmission, the transmitter performs a CCA check and listens on the channel/subband for the duration of the CCA observation time, which should not be less than some threshold (e.g., 15 microseconds). The channel may be considered occupied if the energy level in the channel exceeds some threshold (proportional to the transmit power of the transmitter). If the channel is occupied, the transmitter should delay further attempts to access the medium by some random factor (e.g., some number between 1 and 20) times the CCA observation time. If the channel is not occupied, the transmitter can begin transmitting. However, the maximum contiguous transmission time on the channel should be less than some threshold, such as 5 milliseconds.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 102/180) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 102/180 and the cell in which the UE 102/180 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 102/180 in a cell may have different downlink primary carriers. The same is true for the uplink primary carriers. The network is able to change the primary carrier of any UE 102/180 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 102/180 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 104 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
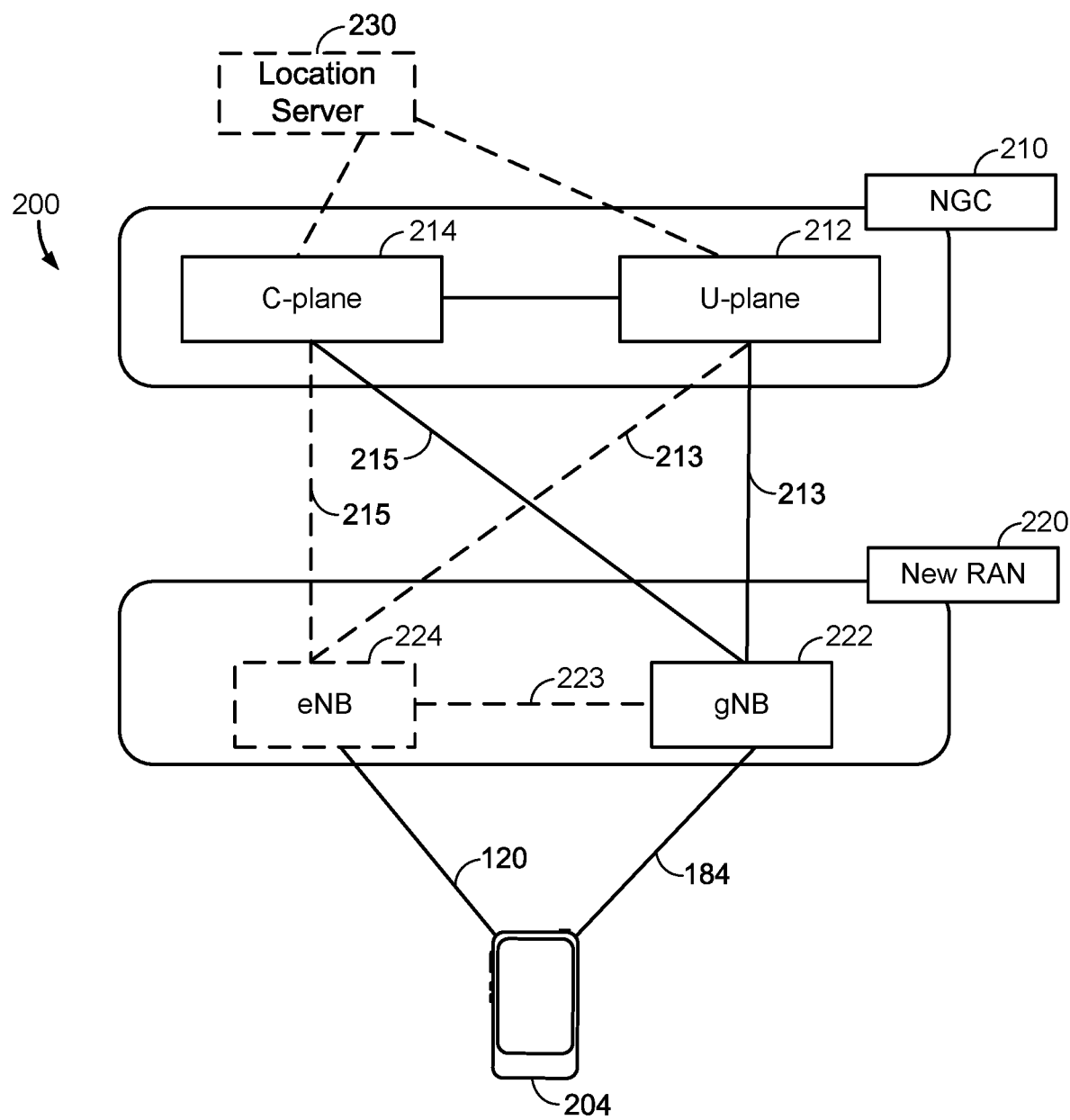
FIGS. 2A and 2B illustrate example wireless network structures, according to various aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
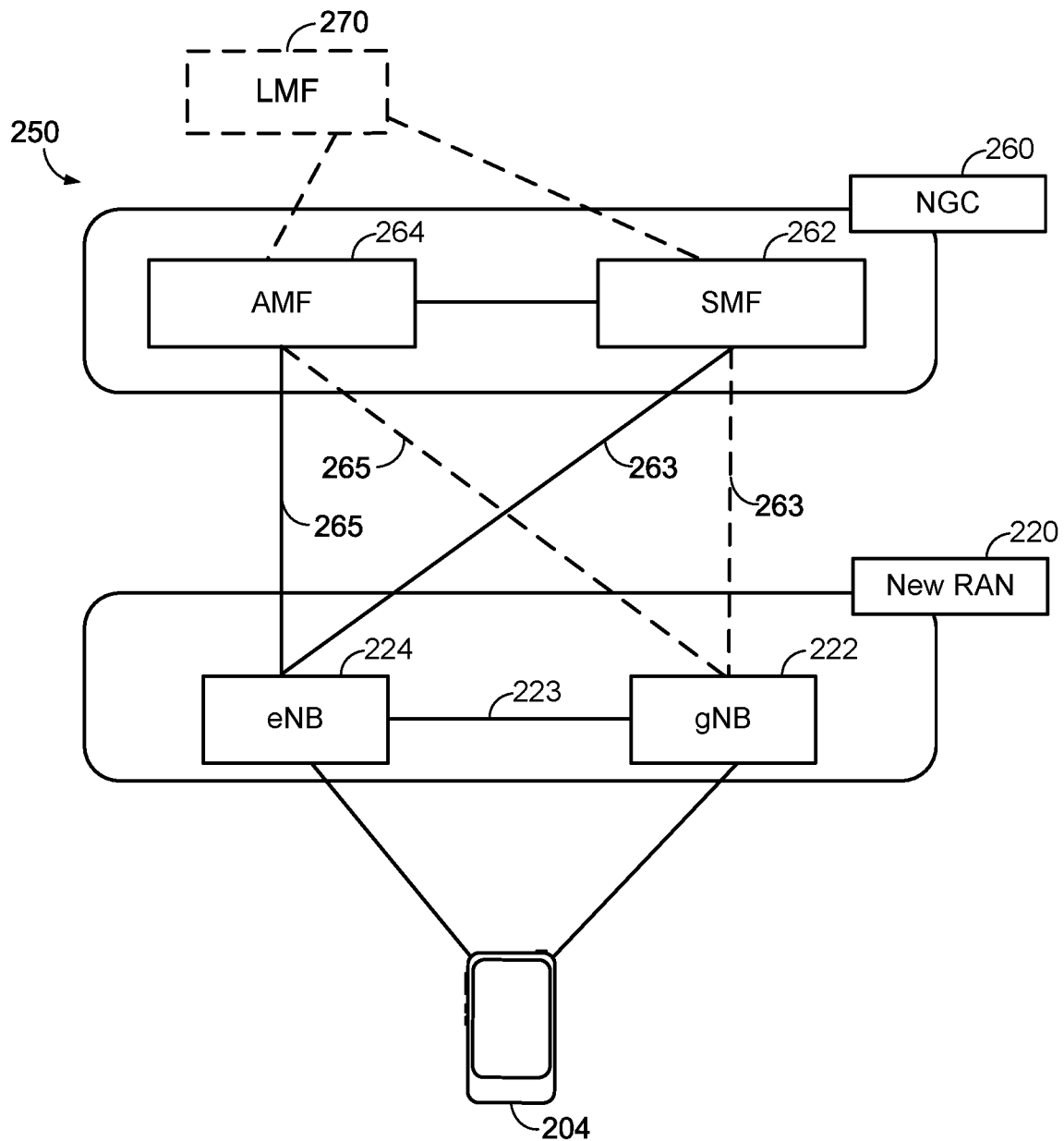

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
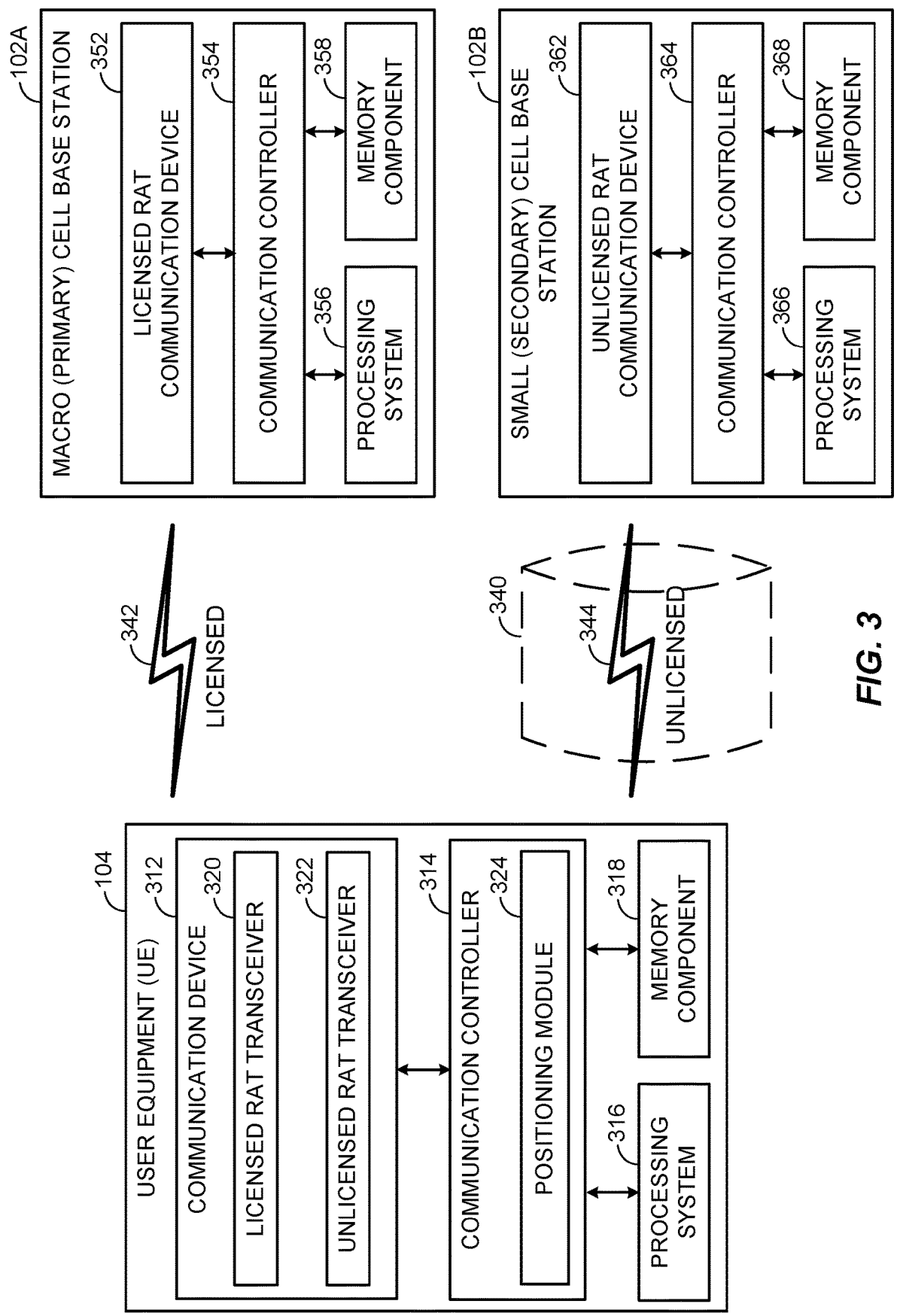
FIG. 3 illustrates an example wireless communication system including a macro cell base station and a secondary cell base station in communication with a UE according to at least one aspect of the disclosure.

FIG. 3 illustrates an example wireless communication system including a dual-mode UE 104 in communication with two base stations, a macro cell base station 102A and a small cell base station 102B (e.g., small cell base station 102' in FIG. 1). The UE 104 and the base stations 102 each generally include a wireless communication device (represented by the communication devices 312, 352, and 362) for communicating with other network elements via at least one designated RAT. The communication devices 312, 352, and 362 may be variously configured for transmitting and encoding signals (e.g., messages, indications, information, and so on), and, conversely, for receiving and decoding signals (e.g., messages, indications, information, pilots, and so on) in accordance with the designated RAT. In some aspects, the communication devices 312, 352, and 362 may be implemented as a transceiver (a combination of transmitter and receiver circuitry), or as separate transmitter and receiver circuitry.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The UE 104 and the base stations 102 may also each generally include a communication controller (represented by the communication controllers 314, 354, and 364) for controlling operation of their respective communication devices 312, 352, and 362 (e.g., directing, modifying, enabling, disabling, etc.). The communication controllers 314, 354, and 364 may operate at the direction of or otherwise in conjunction with respective host system functionality (illustrated as the processing systems 316, 356, and 366 and the memory components 318, 358, and 368). In some aspects, the processing systems 316, 356, and 366 may be implemented as one or more processors, one or more processor cores, a digital signal processor (DSP), an ASIC, a field programmable gate array (FPGA), or the like. In some designs, the communication controllers 314, 354, and 364 may be partly or wholly subsumed by the respective host system functionality.

As will be described in more detail herein, the communication controller 314 includes a positioning module 324 that may perform, or cause the performance of, the UE operations for measuring positioning reference signals as described herein. In an aspect, the positioning module 324 may be a software module storing instructions that, when executed by the processing system 316, cause the UE 104 to perform the UE operations described herein. In another aspect, the positioning module 324 may be a circuit that is part of or coupled to the processing system 316 that performs the UE operations described herein. In yet another aspect, the positioning module 324 may be a combination of hardware and software, such as a firmware component of the UE 104 or a modem for UE 104.

Further, although not illustrated in FIG. 3, the base stations 102 may each include a positioning module that may perform, or cause the performance of, the base station operations for transmitting positioning reference signals as described herein. In an aspect, such a positioning module may be a software module storing instructions that, when executed by the processing system 356/366, cause the base station 102 to perform the base station operations described herein. In another aspect, such a positioning module may be a circuit that is part of or coupled to the processing system 356/366 that performs the base station operations described herein. In yet another aspect, such a positioning module may be a combination of hardware and software, such as a firmware component of the base station 102.

Turning to the illustrated communication in more detail, the UE 104 may transmit and/or receive messages with the macro cell base station 102A via a "primary" wireless link 342 in licensed spectrum. The UE 104 may also transmit and/or receive messages with the small cell base station 102B via a "secondary" wireless link 344 in unlicensed spectrum. Thus, the small cell base station 102B may also be referred to as a secondary cell base station. The messages may include information related to various types of communication (e.g., voice, data, multimedia services, associated control signaling, etc.). In general, the macro cell base station 102A may operate via the primary wireless link 342 in accordance with a licensed RAT (e.g., LTE or 5G). The small cell base station 102B may operate via the secondary wireless link 344 in accordance with an unlicensed RAT (e.g., LTE-Unlicensed™, MulteFire™, WiFi™, 5G in unlicensed spectrum, etc.). The secondary wireless link 344 may operate over a common wireless communication medium of interest, shown by way of example in FIG. 3 as the wireless communication medium 340, which may be shared with still other communication systems and signaling schemes. A medium of this type may be composed of one or more frequency, time, and/or space communication resources (e.g., encompassing one or more channels across one or more carriers) associated with communication between one or more transmitter/receiver pairs.

As a particular example, the wireless communication medium 340 may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the U-NII band used by WLAN technologies, most notably IEEE 802.11x WLAN technologies generally referred to as "WiFi" or as "Wi-Fi." Example systems of this type include different variants of CDMA systems, TDMA systems, FDMA systems, OFDMA systems, SC-FDMA systems, and so on.

In the example of FIG. 3, the communication device 312 of the UE 104 includes a licensed RAT transceiver 320 configured to operate in accordance with the licensed RAT of the macro cell base station 102A and a co-located unlicensed RAT transceiver 322 configured to operate in accordance with the unlicensed RAT of the small cell base station 102B. As an example, the licensed RAT transceiver 320 may operate in accordance with LTE or 5G technology and the unlicensed RAT transceiver 322 may operate in accordance with LTE in unlicensed spectrum, 5G in unlicensed spectrum, or WiFi technology. In some implementations, licensed RAT transceiver 320 and unlicensed RAT transceiver 322 may comprise the same transceiver.

Referring to the processing systems 356 and 366 in more detail, in the downlink, IP packets from a network entity (e.g., location server 230, LMF 270) may be provided to the processing system 356/366. The processing system 356/366 may implement functionality for an RRC layer, a packet data convergence protocol (PDCP) layer, a radio link control (RLC) layer, and a medium access control (MAC) layer. The processing system 356/366 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The communication device 352/362 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. A transmitter of the communication device 352/362 (not shown) handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 104. Each spatial stream may then be provided to one or more different antennas. The transmitter of the communication device 352/362 may modulate an RF carrier with a respective spatial stream for transmission.

At the UE 104, a transceiver 320/322 receives a signal through its respective antenna(s). The transceiver 320/322 recovers information modulated onto an RF carrier and provides the information to the processing system 316. The transceivers 320 and 322 implement Layer-1 functionality associated with various signal processing functions. The transceiver 320/322 may perform spatial processing on the information to recover any spatial streams destined for the UE 104. If multiple spatial streams are destined for the UE 104, they may be combined by the transceiver 320/322 into a single OFDM symbol stream. The transceiver 320/322 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by a channel estimator. The soft decisions are then decoded and de-interleaved to recover the data and control signals that were originally transmitted by the base station 102 on the physical channel. The data and control signals are then provided to the processing system 316, which implements Layer-3 and Layer-2 functionality.

In the UL, the processing system 316 provides demultiplexing between transport and logical channels, packet reassembly, deciphering, header decompression, and control signal processing to recover IP packets from the core network. The processing system 316 is also responsible for error detection.

Similar to the functionality described in connection with the DL transmission by the base station 102, the processing system 316 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 102 may be used by the transceiver 320/322 to select the appropriate coding and modulation schemes, and to facilitate spatial processing. The spatial streams generated by the transceiver 320/322 may be provided to different antenna(s). The transceiver 320/322 may modulate an RF carrier with a respective spatial stream for transmission.

The UL transmission is processed at the base station 102 in a manner similar to that described in connection with the receiver function at the UE 104. A receiver of the communication device 352/362 (not shown) receives a signal through its respective antenna(s). The communication device 352/362 recovers information modulated onto an RF carrier and provides the information to the processing system 356/366.

In the UL, the processing system 356/366 provides demultiplexing between transport and logical channels, packet reassembly, deciphering, header decompression, control signal processing to recover IP packets from the UE 104. IP packets from the processing system 356/366 may be provided to the core network. The processing system 356/366 is also responsible for error detection.

The various components of the UE 104 and the base stations 102 may communicate with each other over data buses (not shown). The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 312, 314, 316, 318, 320, 322, and 324 may be implemented by processor and memory component(s) of the UE 104 (e.g., by execution of appropriate code and/or by appropriate configuration of processor components). Similarly, some or all of the functionality represented by blocks 352, 354, 356, and 358 may be implemented by processor and memory component(s) of the base station 110A (e.g., by execution of appropriate code and/or by appropriate configuration of processor components). Also, some or all of the functionality represented by blocks 362, 364, 366, and 368 may be implemented by processor and memory component(s) of the base station 102B (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 316, 356, and 366, the communication devices 312, 352, and 362, the communication controllers 314, 354, and 364, etc.

To support position estimations in terrestrial wireless networks, a UE 104 can be configured to measure and report the OTDOA between reference RF signals received from two or more network nodes (e.g., different base stations 102 or different TRPs (e.g., antenna arrays) belonging to the same base station 102). Such reference signals may be referred to as positioning reference signaling (PRS) signals in LTE and navigation reference signaling (NRS) signals in 5G. As used herein, the term "positioning reference signal" or PRS refers to LTE PRS, 5G NRS, or any other type of reference signal that can be used for positioning, such as demodulation reference signals (DMRS), cell-specific reference signals (CRS), tracking reference signals (TRS), channel state information reference signals (CSI-RS), primary synchronization signals (PSS), secondary synchronization signals (SSS), and the like.

As discussed further below, OTDOA is a positioning method for wireless networks that provide wireless access using NR, is a multilateration method in which a UE 104 measures the time difference, known as an RSTD, between specific reference RF signals (e.g., PRS, CRS, CSI-RS, etc.) transmitted by different pairs of network nodes (e.g., base stations 102, antennas of base stations 102, etc.) and either reports these time differences to a location server, such as the location server 230, LMF 270, or computes a location estimate itself from these time differences.

Figure 4A:
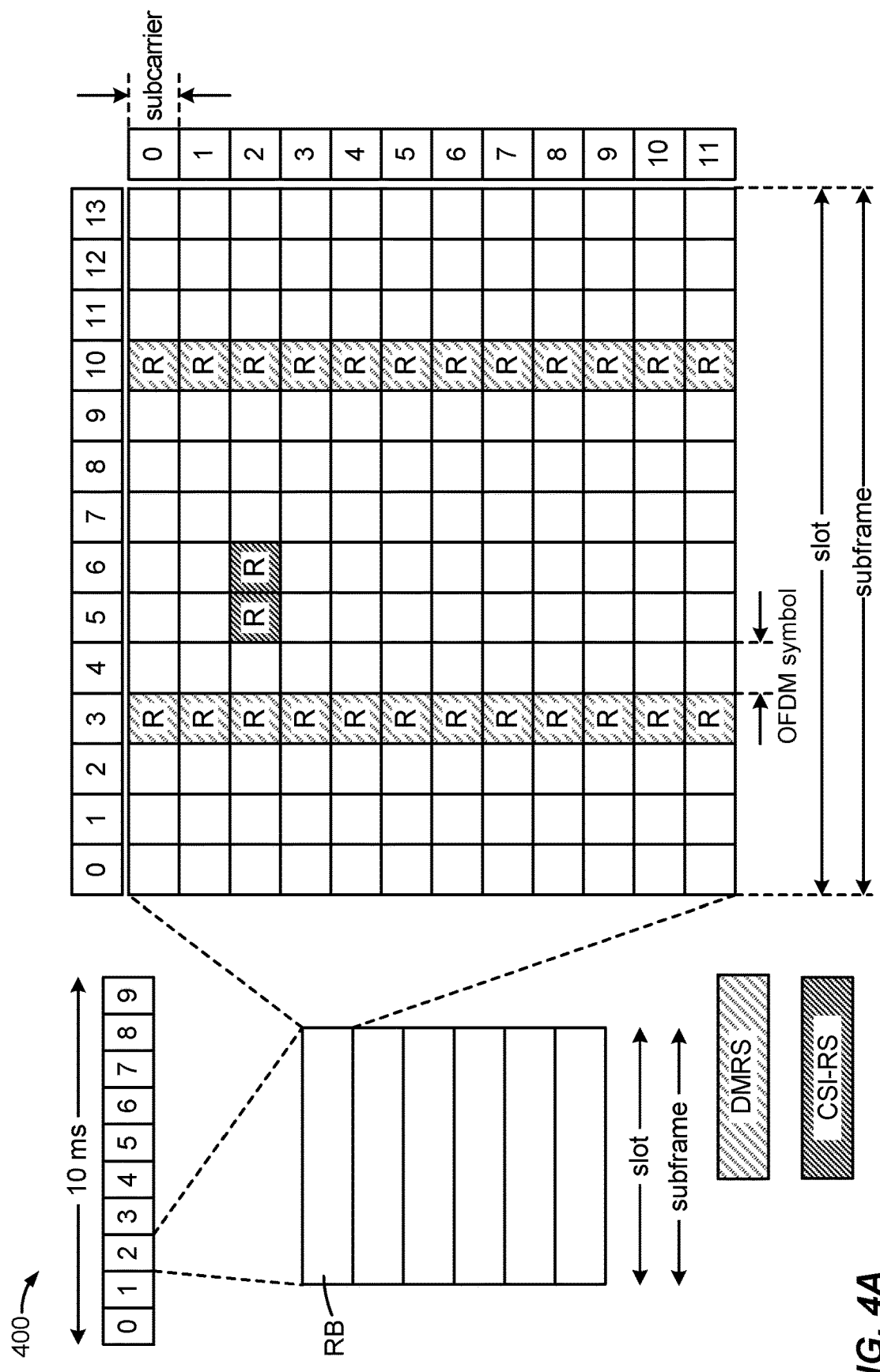
FIGS. 4A to 4D are diagrams illustrating examples of frame structures and channels within the frame structures, according to aspects of the disclosure.
Figure 4B:
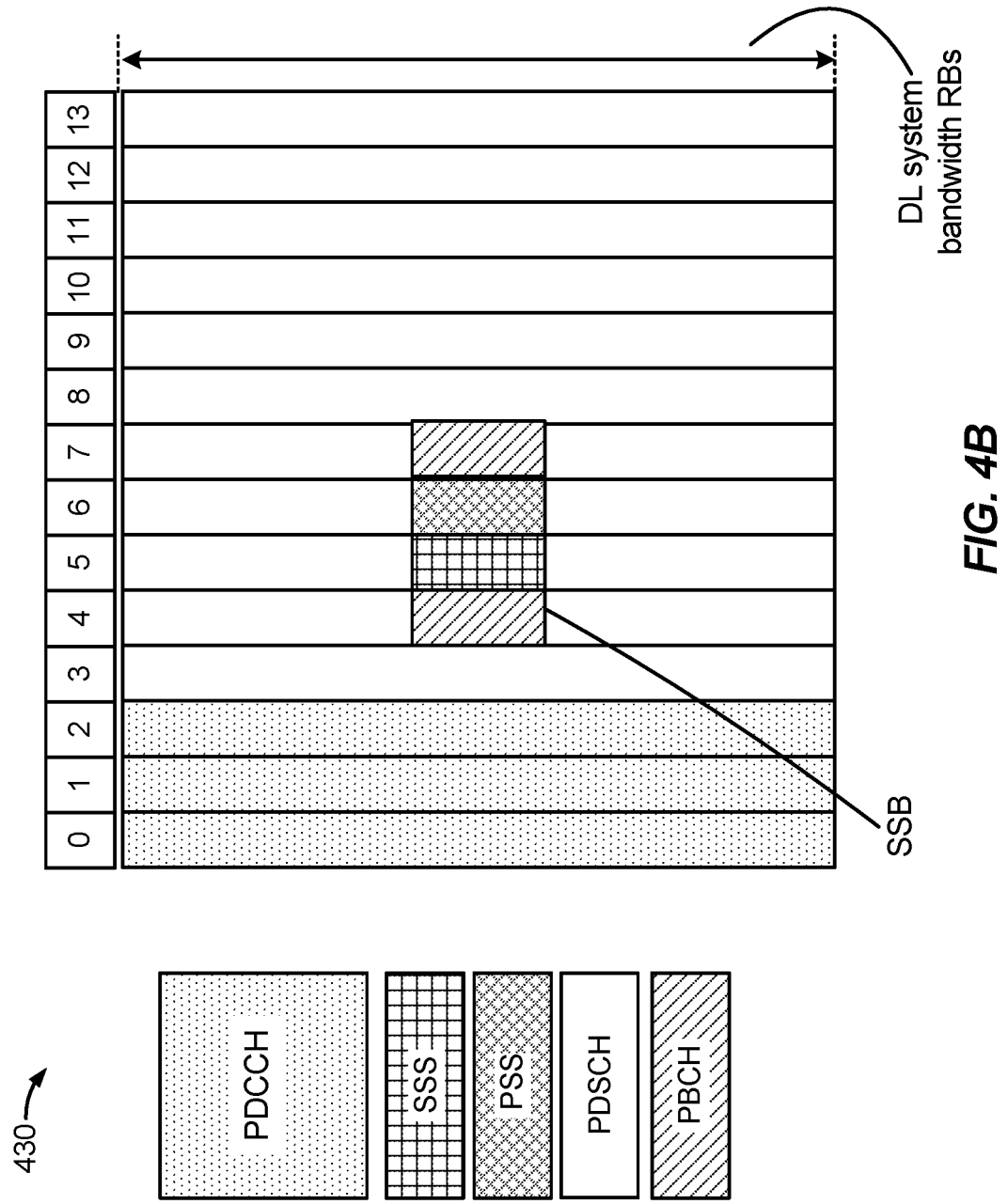
Figure 4C:
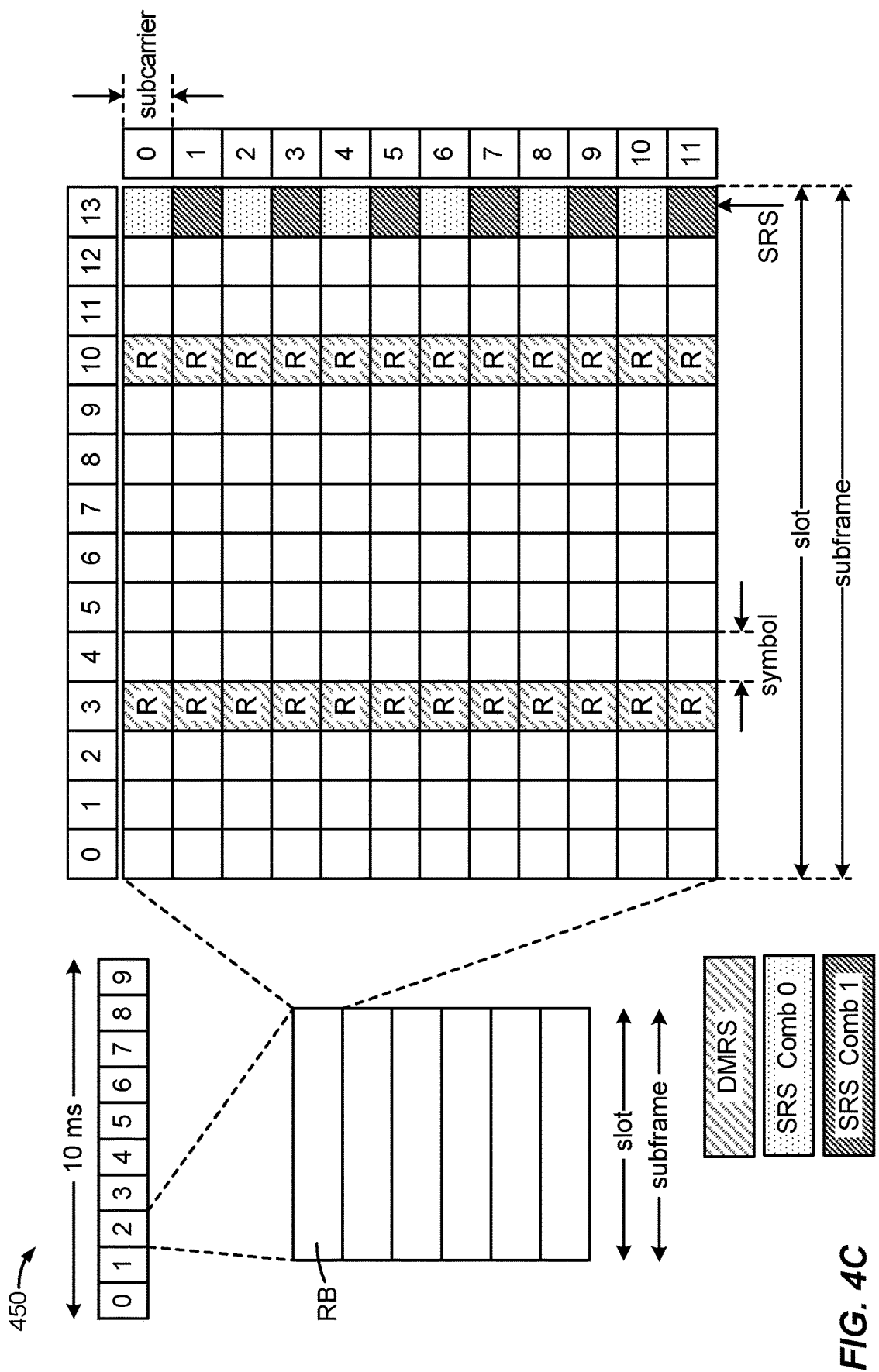
Figure 4D:
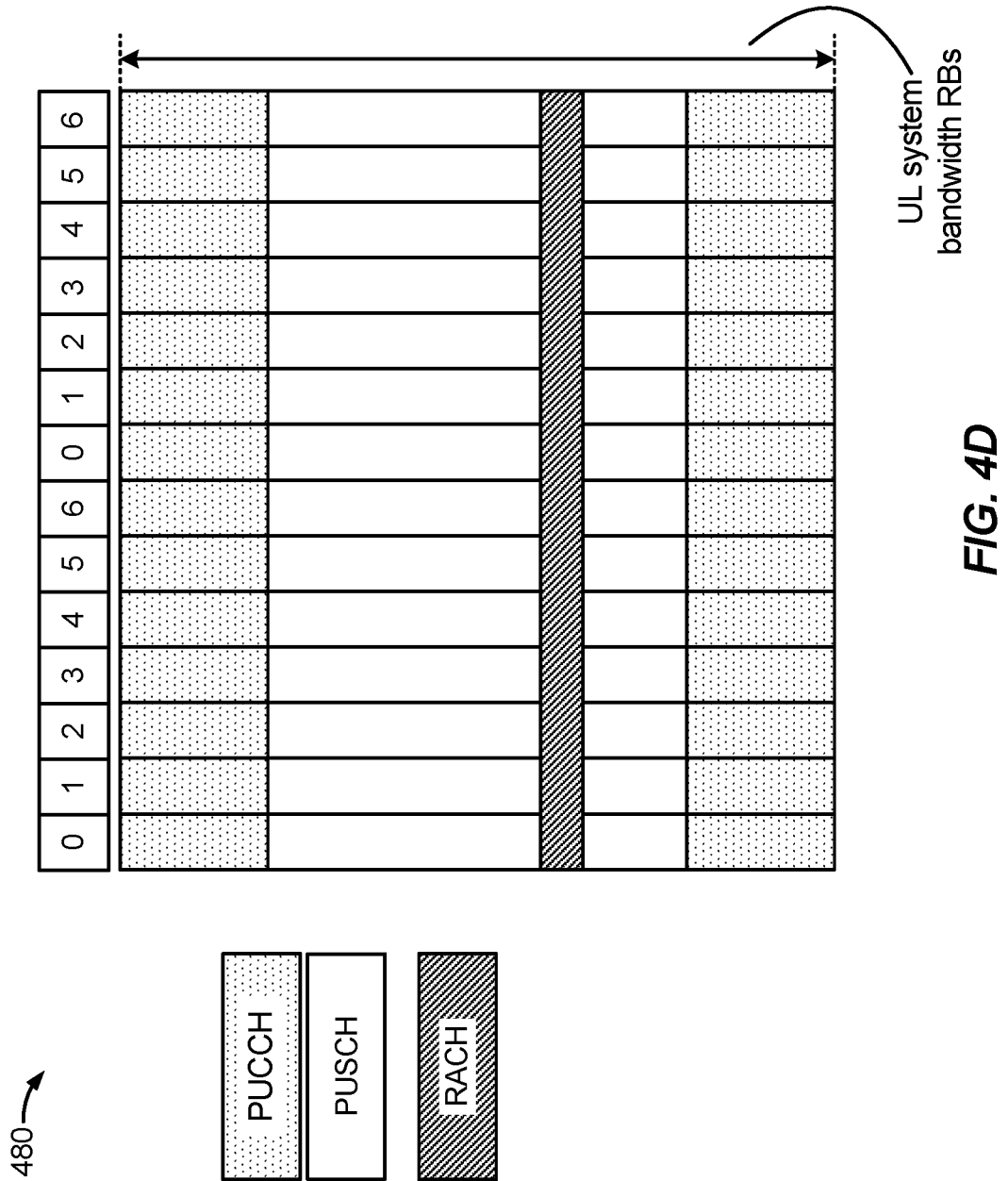

FIG. 4A is a diagram 400 illustrating an example of a DL frame structure, according to aspects of the disclosure. FIG. 4B is a diagram 430 illustrating an example of channels within the DL frame structure, according to aspects of the disclosure. FIG. 4C is a diagram 450 illustrating an example of an UL frame structure, according to aspects of the disclosure. FIG. 4D is a diagram 480 illustrating an example of channels within the UL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include DMRS and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB. The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS for channel estimation at the base station. The UE may additionally transmit sounding reference signals (SRS) in, for example, the last symbol of a subframe. The SRS may

TABLE 1

| Subcarrier spacing (kHz) | Symbols/ slot | slots/ subframe | slots/ frame | slot (ms) | Symbol duration (µs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

In the examples of FIGS. 4A to 4D, a numerology of 15 kHz is used. Thus, in the time domain, a frame (e.g., 10 ms) is divided into 10 equally sized subframes of 1 ms each, and each subframe includes one time slot. In FIGS. 4A to 4D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and 7 consecutive symbols (for DL, OFDM symbols; for UL, SC-FDMA symbols) in the time domain, for a total of have a comb structure, and a UE may transmit SRS on one of the combs. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 4D illustrates an example of various channels within an UL subframe of a frame, according to aspects of the disclosure. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 5:
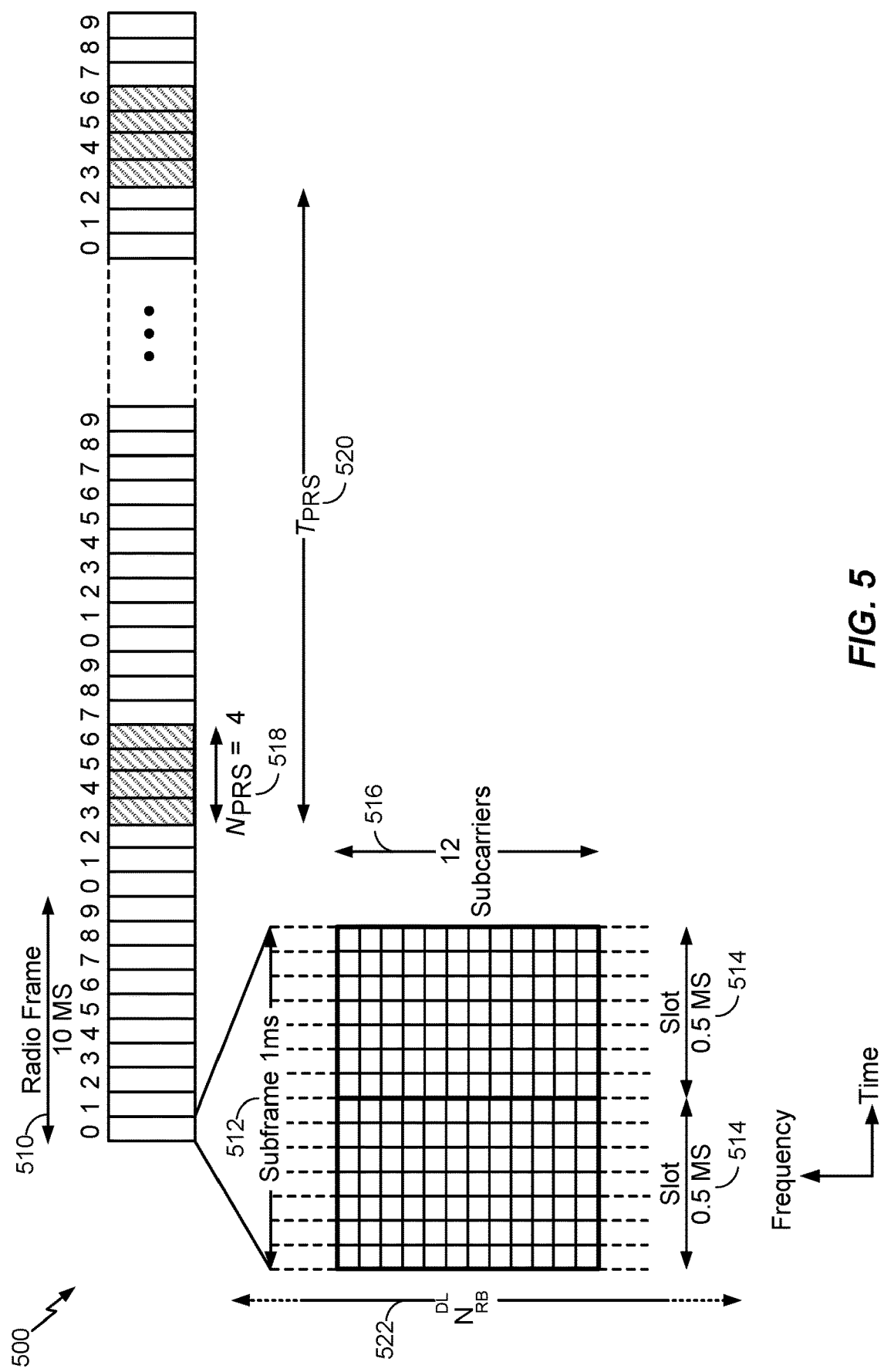
FIG. 5 is a diagram of a structure of an example subframe sequence with positioning reference signaling (PRS) positioning occasions.

FIG. 5 shows a structure of an example subframe sequence 500 with PRS positioning occasions. Subframe sequence 500 may be applicable to broadcast of PRS signals from base stations 102- in communication system 100. While FIG. 5 provides an example of a subframe sequence for LTE, similar or different subframe sequence implementations may be realized for other communication technologies/protocols, such as NR. In FIG. 5, time is represented horizontally (e.g., on an X axis) with time increasing from left to right, while frequency is represented vertically (e.g., on a Y axis) with frequency increasing (or decreasing) from bottom to top. As shown in FIG. 5, downlink and uplink radio frames 510 may be of 10 ms duration each. For downlink frequency division duplex (FDD) mode, radio frames 510 are organized, in the illustrated embodiments, into ten subframes 512 of 1 ms duration each. Each subframe 512 comprises two slots 514, each of, for example, 0.5 ms duration.

In the frequency domain, the available bandwidth may be divided into uniformly spaced orthogonal subcarriers 516. For example, for a normal length cyclic prefix using, for example, 15 kHz spacing, subcarriers 516 may be grouped into a group of twelve (12) subcarriers. Each grouping, which comprises the 12 subcarriers 516, is termed a resource block (RB) and, in the example above, the number of subcarriers in the resource block may be written as $N_{SC}^{RB}=12$. For a given channel bandwidth, the number of available resource blocks on each channel 522, which is also called the transmission bandwidth configuration 522, is indicated as $N_{RB}^{DL}$. For example, for a 3 MHz channel bandwidth in the above example, the number of available resource blocks on each channel 522 is given by $N_{RB}^{DL}=15$.

In the communication system 100 illustrated in FIG. 1, a base station 102, such as any of the base stations 102, may transmit frames, or other physical layer signaling sequences, supporting PRS signals (i.e. a downlink (DL) PRS) according to frame configurations either similar to, or the same as that, shown in FIG. 5 and (as described later) in FIG. 6, which may be measured and used for UE (e.g., UE 104) position determination. As noted, other types of wireless nodes and base stations (e.g., a gNB or WiFi AP) may also be configured to transmit PRS signals configured in a manner similar to (or the same as) that depicted in FIGS. 5 and 6. Since transmission of a PRS by a wireless node or base station is directed to all UEs within radio range, a wireless node or base station can also be considered to transmit (or broadcast) a PRS.

A PRS may be transmitted by wireless nodes (e.g., base stations 102) after appropriate configuration (e.g., by an operations and maintenance (O&M) server). A PRS may be transmitted in special positioning subframes that are grouped into positioning occasions. PRS occasions may be grouped into one or more PRS occasion groups. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 5 illustrates a periodicity of positioning occasions where $N_{PRS}$ equals 4 518 and $T_{PRS}$ is greater than or equal to 20 520. In some aspects, $T_{PRS}$ may be measured in terms of the number of subframes between the start of consecutive positioning occasions.

As discussed herein, in some aspects, OTDOA assistance data may be provided to a UE 104 by a location server 230 or LMF 270 for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method.

PRS-based positioning by a UE 104 may be facilitated by indicating the serving cell for the UE 104 in the OTDOA assistance data (e.g., with the reference cell indicated as being the serving cell).

In some aspects, OTDOA assistance data may also include "expected RSTD" parameters, which provide the UE 104 with information about the RSTD values the UE 104 is expected to measure at its current location between the reference cell and each neighbor cell, together with an uncertainty of the expected RSTD parameter. The expected RSTD, together with the associated uncertainty, may define a search window for the UE 104 within which the UE 104 is expected to measure the RSTD value. In 5G NR, the expected RSTD value is a single value defined as the RSTD the UE 104 is expected to measure (at the UE's 104 location). The value range of the expected RSTD is +/−500 microseconds (μs). When any of the resources used for the DL positioning measurement are in FR1, the value range for the uncertainty of the expected RSTD is +/−32 μs. When all of the resources used for the DL positioning measurement are in FR2, the value range for the uncertainty of the expected RSTD is +/−8 μs. OTDOA assistance information may also include PRS configuration information parameters, which allow a UE 104 to determine when a PRS positioning occasion occurs on signals received from various neighbor cells relative to PRS positioning occasions for the reference cell, and to determine the PRS sequence transmitted from various cells in order to measure a signal time of arrival (ToA) or RSTD.

Using the RSTD measurements, the known absolute or relative transmission timing of each cell, and the known position(s) of wireless node physical transmitting antennas for the reference and neighboring cells, the UE 104's position may be calculated (e.g., by the UE 104 or by the location server 230/LMF 230). More particularly, the RSTD for a neighbor cell "k" relative to a reference cell "Ref," may be given as ($ToA_k - ToA_{Ref}$), where the ToA values may be measured modulo one subframe duration (1 ms) to remove the effects of measuring different subframes at different times. ToA measurements for different cells may then be converted to RSTD measurements and sent to the location server 230/LMF 270 by the UE 104. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 104's position may be determined.

A collection of resource elements that are used for transmission of PRS is referred to as a "PRS resource." The collection of resource elements can span multiple physical resource blocks (PRBs) in the frequency domain and N (e.g., 1 or more) consecutive symbol(s) within a slot 414 in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance."

Figure 6:
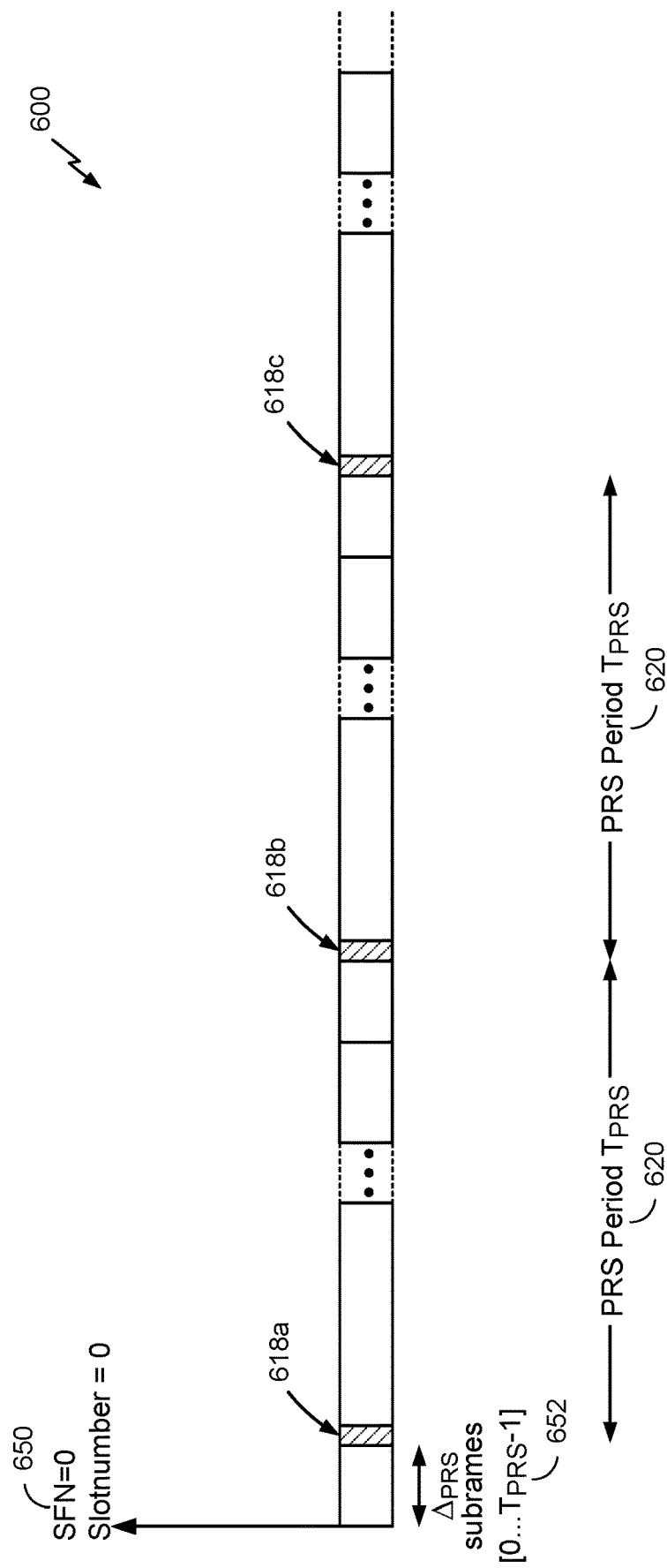
FIGS. 6 and 7 are diagrams illustrating further aspects of PRS transmission for a cell supported by a wireless node.

FIG. 6 illustrates an exemplary PRS configuration 600 for a cell supported by a wireless node (such as a base station 102). Again, PRS transmission for LTE is assumed in FIG. 6, although the same or similar aspects of PRS transmission to those shown in and described for FIG. 6 may apply to NR and/or other wireless technologies. FIG. 6 shows how PRS positioning occasions are determined by a system frame number (SFN), a cell specific subframe offset (ApRs) 652, and the PRS periodicity ($T_{PRS}$) 620. Typically, the cell specific PRS subframe configuration is defined by a "PRS Configuration Index" IPRS included in the OTDOA assistance data. The PRS periodicity ($T_{PRS}$) 620 and the cell specific subframe offset (APRs) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | | Reserved |

A PRS configuration is defined with reference to the system frame number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where of is the SFN with $0 \leq n_f \leq 1023$, $n_s$ is the slot number within the radio frame defined by of with $0 \leq n_s \leq 19$, $T_{PRS}$ is the PRS periodicity 620, and APRs is the cell-specific subframe offset 652.

As shown in FIG. 6, the cell specific subframe offset $\Delta$PRs 652 may be defined in terms of the number of subframes transmitted starting from system frame number 0 (Slot 'Number 0', marked as slot 650) to the start of the first (subsequent) PRS positioning occasion. In the example in FIG. 6, the number of consecutive positioning subframes ($N_{PRS}$) in each of the consecutive PRS positioning occasions 618a, 618b, and 618c equals 4.

In some aspects, when a UE 104 receives a PRS configuration index $I_{PRS}$ in the OTDOA assistance data for a particular cell, the UE 104 may determine the PRS periodicity $T_{PRS}$ 620 and PRS subframe offset APRs using Table 1. The UE 104 may then determine the radio frame, subframe and slot when a PRS is scheduled in the cell (e.g., using equation (1)). The OTDOA assistance data may be determined by, for example, the location server 170, and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset 652) relative to other cells in the network that use a different frequency. In SFN-synchronous networks all wireless nodes (e.g., base stations 102) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 104 may determine the timing of the PRS occasions of the reference and neighbor cells for OTDOA positioning, if the UE 104 can obtain the cell timing (e.g., SFN) of at least one of the cells, e.g., the reference cell or a serving cell. The timing of the other cells may then be derived by the UE 104 based, for example, on the assumption that PRS occasions from different cells overlap.

For LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP. A directional PRS may be configured as just described and may, for example, use a low PRS duty cycle (e.g., $N_{PRS}=1$, $T_{PRS}=160$ subframes) or a high duty cycle.

Figure 7:
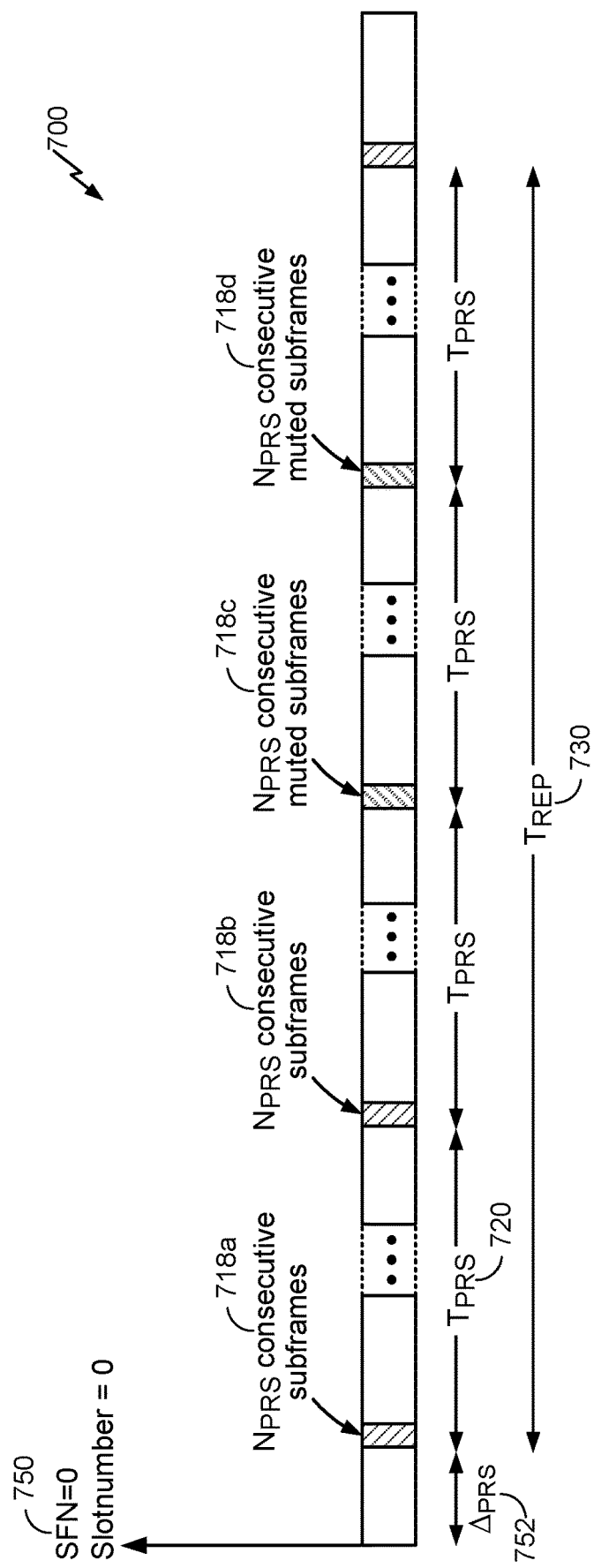

FIG. 7 illustrates an exemplary PRS configuration 700 that includes a PRS muting sequence. The positioning reference signal configuration 700 may be for PRS transmission for LTE or for NRS transmission for 5G NR, and/or other radio access technologies. For simplicity, however, the positioning reference signals in FIG. 7 are referred to as PRS. Like FIG. 6, FIG. 7 shows how PRS positioning occasions are determined by an SFN, a cell specific subframe offset (ApRs) 752, and the PRS Periodicity ($T_{PRS}$) 720. As shown in FIG. 7, the cell specific subframe offset APRs 752 may be defined in terms of the number of subframes transmitted starting from system frame number 0 (Slot 'Number 0', marked as slot 750) to the start of the first (subsequent) PRS positioning occasion. In the example in FIG. 7, the number of consecutive positioning subframes ($N_{PRS}$) in each of the consecutive PRS positioning occasions 718a and 718b equals 4.

Within each positioning occasion, PRS are generally transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and ToA and RSTD measurement, by UEs (such as the UE 104), of PRS signals that are not muted (by avoiding interference from PRS signals that have been muted). For example, when the (strong) PRS signal the UE 104 receives from one base station 102 is muted, the (weak) PRS signals from a neighboring base station 102 can be more easily detected by the UE 104. Muting may be viewed as the non-transmission of a PRS for a given positioning occasion for a particular cell. Muting patterns (also referred to as muting sequences) may be signaled to a UE 104 using bit strings. For example, in a bit string signaled to indicate a muting pattern, if a bit at position j is set to '0', then the UE 104 may infer that the PRS is muted for a $j^{th}$ positioning occasion.

With reference to FIG. 7, the muting sequence periodicity $T_{REP}$ 730 includes two consecutive PRS positioning occasions 718a and 718b followed by two consecutive muted PRS positioning occasions 718c and 718d. In LTE, the PRS muting configuration of a cell is only defined by a periodic muting sequence (e.g., muting sequence periodicity $T_{REP}$ 730), as opposed to an aperiodic or semi-persistent muting sequence. As such, the two consecutive PRS positioning occasions 718a and 718b followed by the two consecutive muted PRS positioning occasions 718c and 718d will repeat for the next muting sequence periodicity $T_{REP}$ 730.

To further improve hearability of PRS, positioning subframes may be low-interference subframes that are transmitted without user data channels. As a result, in ideally synchronized networks, PRS may receive interference from other cell's PRS with the same PRS pattern index (i.e., with the same frequency shift), but not from data transmissions. The frequency shift, in LTE, for example, is defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of 6.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration (e.g., PRS configuration 600/700), where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$) In some implementation, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

Figure 8:
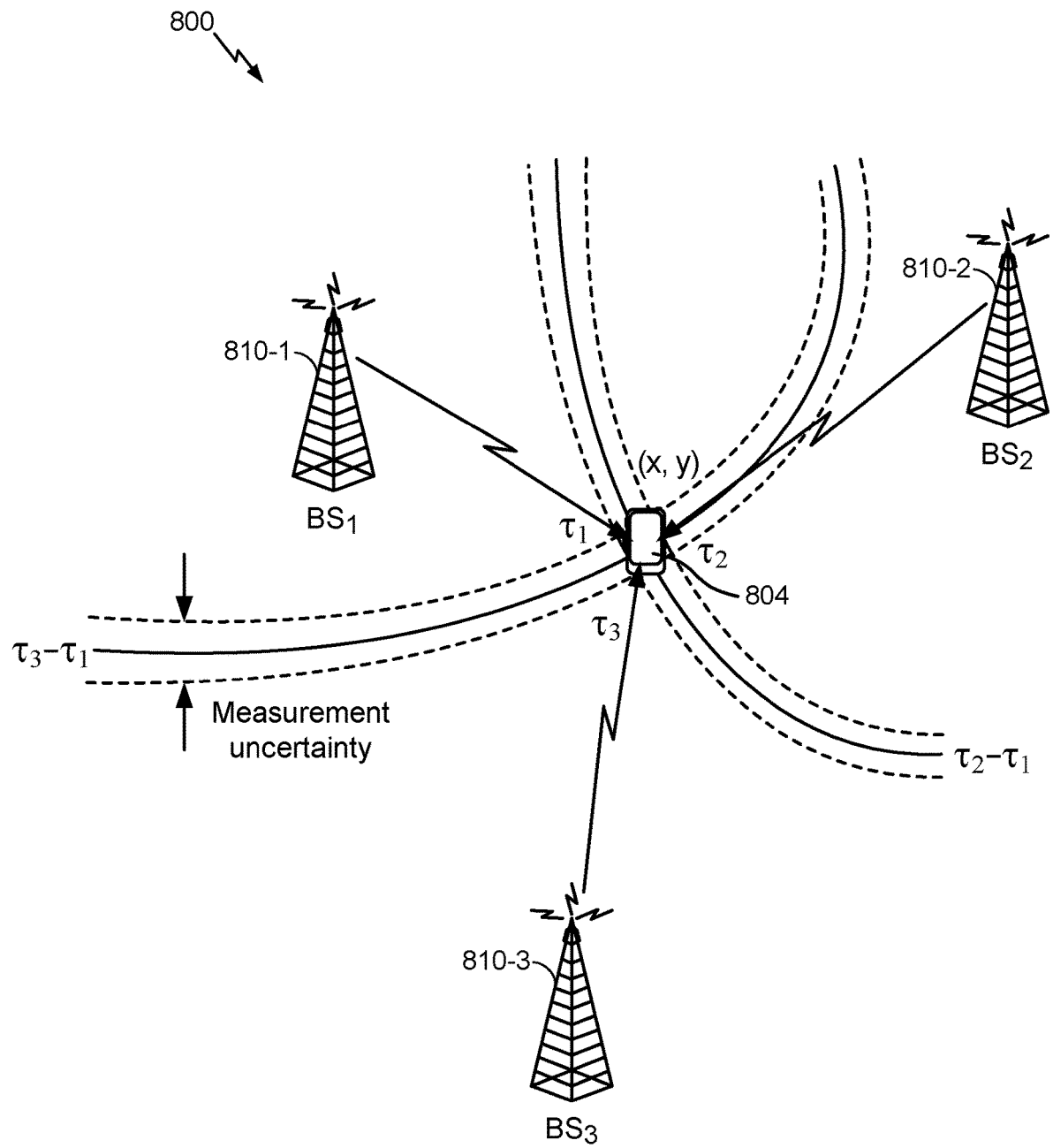
FIG. 8 is a diagram illustrating an exemplary technique for determining a position of a mobile device using information obtained from a plurality of base stations.

FIG. 8 illustrates an exemplary wireless communications system 800 according to various aspects of the disclosure. In the example of FIG. 8, a UE 804 (e.g., any of the UEs described herein) is attempting to calculate an estimate of its position, or assist another entity (e.g., a base station or core network component, another UE, a location server, a third party application, etc.) to calculate an estimate of its position. The UE 804 may communicate wirelessly with a plurality of base stations 802-1, 802-2, and 802-3 (collectively, base stations 802), which may correspond to any of the base stations described herein, using RF signals and standardized protocols for the modulation of the RF signals and the exchange of information packets. By extracting different types of information from the exchanged RF signals, and utilizing the layout of the wireless communications system 800 (i.e., the base stations locations, geometry, etc.), the UE 804 may determine its position, or assist in the determination of its position, in a predefined reference coordinate system. In an aspect, the UE 804 may specify its position using a two-dimensional coordinate system; however, the aspects disclosed herein are not so limited, and may also be applicable to determining positions using a three-dimensional coordinate system, if the extra dimension is desired. Additionally, while FIG. 8 illustrates one UE 804 and three base stations 802, as will be appreciated, there may be more UEs 804 and more or fewer base stations 802.

To support position estimates, the base stations 802 may be configured to broadcast reference RF signals (e.g., PRS, CRS, CSI-RS, synchronization signals, etc.) to UEs 804 in their coverage area to enable a UE 804 to measure characteristics of such reference RF signals. For example, the UE 804 may use the OTDOA positioning method, and the UE 804 may measure the RSTD between specific reference RF signals (e.g., PRS, CRS, CSI-RS, etc.) transmitted by different pairs of network nodes (e.g., base stations 802, antennas of base stations 802, etc.).

Generally, RSTDs are measured between a reference network node (e.g., base station 802-1 in the example of FIG. 8) and one or more neighbor network nodes (e.g., base stations 802-2 and 802-3 in the example of FIG. 8). The reference network node remains the same for all RSTDs measured by the UE 804 for any single positioning use of OTDOA and would typically correspond to the serving cell for the UE 804 or another nearby cell with good signal strength at the UE 804. In an aspect, where a measured network node is a cell supported by a base station, the neighbor network nodes would normally be cells supported by base stations different from the base station for the reference cell and may have good or poor signal strength at the UE 804. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 804 for the reference network node (e.g., base station 802-1 in the example of FIG. 8) and the neighbor network nodes (e.g., base stations 802-2 and 802-3 in the example of FIG. 8) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 804 as the reference network node.

In an aspect, while the location server (e.g., location server 230, LMF 270) may send the assistance data to the UE 804, alternatively, the assistance data can originate directly from the network nodes (e.g., base stations 802) themselves (e.g., in periodically broadcasted overhead messages, etc.). Alternatively, the UE 804 can detect neighbor network nodes itself without the use of assistance data.

In the example of FIG. 8, the measured time differences between the reference cell of base station 802-1 and the neighboring cells of base stations 802-2 and 802-3 are represented as τ2-τ1 and τ3-τ1, where τ1, τ2, and τ3 represent the transmission time of a reference RF signal from the transmitting antenna(s) of base station 802-1, 802-2, and 802-3, respectively, to the UE 804, and includes any measurement noise at the UE 804. The UE 804 may then convert the ToA measurements for different network nodes to RSTD measurements and (optionally) send them to the location server. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 804 position may be determined (either by the UE 804 or the location server).

The ToA $T_i$ at the UE 804 for the shortest path from base station i is $T_i = \tau_i + D_i/c$, where $D_i$ is the Euclidean distance between the base stations i with location (qi) and the UE 804 with location (p), c is the speed of light in the air (299700 km/s), and qi is known through the cell information database. The Euclidean distance (i.e., the line distance between two points) is given by:

$$c(T_i - \tau_j) = \sqrt{2}R \sqrt{1 - \sin(\varphi_1)\sin(\varphi_2) - \cos(\varphi_1)\cos(\varphi_2)\cos(\beta_1 - \beta_2)},$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the UE 104 first jointly processes all the resource elements (REs) on the channel on which that network node (e.g., base station 802) is transmitting the reference RF signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 804 may chose a ToA estimate that is the earliest local maximum of the CER that is at least X dB higher than the median of the CER and a maximum Y dB lower than the main peak on the channel. The UE 804 determines the CER for each reference RF signal from each network node in order to determine the ToA of each reference RF signal from the different network nodes.

When the UE 804 obtains a location estimate itself using OTDOA measured time differences, the necessary additional data (e.g., network nodes' locations and relative transmission timing) may be provided to the UE 804 by a location server (e.g., location server 230, LMF 270). In some implementations, a location estimate for the UE 804 may be obtained (e.g., by the UE 804 itself or by the location server) from OTDOA measured time differences and from other measurements made by the UE 804 (e.g., measurements of signal timing from global positioning system (GPS) or other global navigation satellite system (GNSS) satellites). In these implementations, known as hybrid positioning, the OTDOA measurements may contribute towards obtaining the UE's 804 location estimate but may not wholly determine the location estimate.

Uplink time difference of arrival (UTDOA) is a similar positioning method to OTDOA, but is based on uplink reference RF signals transmitted by the UE (e.g., UE 804). Further, transmission and/or reception beamforming at the network node and/or UE 804 can enable wideband bandwidth at the cell edge for increased precision. Beam refinements may also leverage channel reciprocity procedures in NR.

As used herein, a "network node" may be a base station (e.g., a base station 102), a cell of a base station (e.g., a cell of a base station 102), a remote radio head, an antenna of a base station (e.g., an antenna of a base station 102, where the locations of the antennas of a base station are distinct from the location of the base station itself), an array of antennas of a base station (e.g., an array of antennas of a base station 102, where the locations of the antenna arrays are distinct from the location of the base station itself), or any other network entity capable of transmitting reference RF signals. Further, as used herein, a "network node" may refer to either a network node or a UE.

The term "position estimate" is used herein to refer to an estimate of a position for a UE (e.g., UE 104), which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

As noted above, the positioning reference signals transmitted by the various base stations described herein may be NRS. There are a number of design goals for NRS signals in 5G NR. One design goal is that NRS signals should enable a receiver (e.g., any UE described herein) to take accurate measurements of the NRS signals that are robust to multipath. Another design goal is that NRS signals should be able to provide navigation and positioning support. More specifically, a receiver should be able to determine a range, pseudorange, and/or angle measurement for positioning from received NRS signals. A receiver should also be able to determine Doppler measurements for velocity estimation and navigation from received NRS signals. As another design goal, NRS signals should have a unified and independent signal structure. Independence of NRS signals from the cyclic prefix (CP), antenna port numbers, and native symbol length can be supported by service multiplexing.

Additionally, only NRS should be transmitted within the NRS envelope. That is, NRS signals should not be intermixed with CRS, TRS, PSS, SSS, PBCH, etc. Yet another design goal is that NRS signals should provide a high level of orthogonality/isolation among cells/TRPs to combat the near-far problem (also referred to as the hearability problem). The near-far problem is a condition in which a receiver captures a strong signal (likely from a nearby transmitter), which makes it impossible, or at least difficult, for the receiver to detect a weaker signal (likely from a far transmitter). This can be addressed using techniques such as time-frequency orthogonality, code isolation, antenna-pattern isolation, and the like. As another design goal, NRS signals should only require low receiver power consumption.

As noted above, in LTE, the PRS muting configuration of a cell/TRP is only defined by a periodic muting sequence (e.g., muting sequence periodicity $T_{REP}$ 630), as opposed to an aperiodic or semi-persistent muting sequence. Thus, to address the above design goals of NRS in 5G NR, and in particular the goal of providing a high level of orthogonality/ isolation among cells/TRPs to combat the near-far problem, the present disclosure provides techniques for semi-persistent or aperiodic NRS muting patterns.

In an aspect, each cell ID (or NRS ID) may be configured with additional aperiodic or semi-persistent NRS muting patterns. That is, additional aperiodic or semi-persistent NRS muting patterns may be associated with a particular cell/TRP (identified by its cell/TRP ID) or a particular NRS configuration (identified by its NRS ID, e.g., NRS configuration index). These on-demand NRS muting patterns can be configured at a UE-level (i.e., per UE served by a cell/TRP) or at an NRS-level (e.g., per NRS configuration). Note that a semi-persistent muting pattern is one that may be configured to occur periodically for some length of time before being de-configured, and an aperiodic muting pattern is one that is configured in real-time as needed, and may not have any pattern repetition. A semi-persistent muting pattern may be configured by a medium access control (MAC) control element (CE), and an aperiodic muting pattern may be configured by downlink control information (DCI).

For UE-level on-demand muting, if a UE is configured with multiple NRS configurations (e.g., positioning reference signal configuration 600/700) for a given cell/TRP, then the UE-level on-demand NRS muting patterns may be that the given cell/TRP mutes NRS configurations configured for the UE for that cell/TRP. More specifically, the cell/TRP may mute one, multiple, or all of the NRS configurations configured for the involved UE. In that way, the UE will not receive NRS signals from the cell/TRP during the muted NRS configurations, and will be better able to hear NRS signals transmitted by neighboring cells/TRPs during the muted NRS configurations.

For NRS-level on-demand muting, if a UE is configured with multiple NRS configurations (e.g., positioning reference signal configuration 600/700) for a given cell/TRP, then the NRS-level on-demand muting patterns may be that the given cell/TRP mutes NRS transmissions of a specific (or a subset of) NRS configurations for that cell/TRP. That is, the cell/TRP may mute one or more NRS occasions (e.g., positioning reference signal occasions 518/618) of a given NRS configuration (e.g., positioning reference signal configuration 600/700). In that way, the UE will not receive NRS signals from the cell/TRP during the muted NRS occasions, and will be better able to hear NRS signals transmitted by neighboring cells during the muted NRS occasions.

In an aspect, whether UE-level or NRS-level, the on-demand muting patterns can be related to a specific subband of a specific NRS occasion group. That is, for UE-level on-demand muting, an NRS configuration transmitted on a particular subband and belonging to a particular group of NRS occasions can be muted. Similarly, for NRS-level on-demand muting, an NRS occasion transmitted on a particular subband and belonging to a particular group of NRS occasions can be muted. Thus, just one subband could be muted. Further, on-demand muting may only be performed for some length of time, for example, 20 subframes.

In addition, UE-level or NRS-level on-demand muting can be triggered using UL DCI, DL DCI, or a new DCI format that is to be used to trigger aperiodic NRS transmissions. The base station can trigger additional NRS transmissions when needed to align NRS transmissions across different cells/TRPs or to opportunistically use unused resources. The UE can also request specific NRS transmissions to be transmitted, but again, it is the base station's decision whether and which NRS transmissions will be triggered. The new DCI format used to trigger aperiodic NRS muting may be the same DCI that is used to trigger actual aperiodic NRS transmissions. Alternatively, UE-level or NRS-level on-demand muting can be triggered using a MAC CE command. In the case of a MAC CE command, instantiating UE-level or NRS-level on-demand muting may be referred to as activating or deactivating instead of configuring/triggering, as with DCI instantiation.

The DCI is transmitted on the PDCCH. The DCI indicates to a UE how to decode the data that is transmitted on the PDSCH in the same subframe. As such, the DCI is like a map for a UE to find and decode its respective PDSCH from the resource grid. The DCI format provides the UE details on how to decode the PDSCH, such as the number of resource blocks, resource allocation type, modulation scheme, transport block, redundancy version, coding rate, and here, muting parameters.

In an aspect, there may be various priority rules to determine which type of muting pattern (i.e., aperiodic, semi-persistent, periodic, specific) has priority over another. An aperiodic muting pattern can switch off (i.e., mute) an otherwise scheduled periodic, semi-persistent, or aperiodic NRS transmission. A semi-persistent muting pattern can switch off (i.e., mute) an otherwise scheduled periodic or semi-persistent NRS transmission, but cannot switch off an aperiodic NRS transmission. A periodic muting pattern can switch off (i.e., mute) an otherwise scheduled periodic NRS transmission, but cannot switch off an aperiodic or semi-persistent NRS transmission. Finally, a specific muting pattern may be implicitly triggered whenever a specific semi-persistent scheduling (SPS) ultra-reliable low latency communication (URLLC) grant or rate-matching resource configuration is triggered.

In an aspect, an on-demand (either aperiodic or semi-persistent) muting pattern can be triggered in one carrier frequency and applied to NRS transmitted on another carrier frequency. Carrier frequencies (also referred to as bandwidth paths or frequency layers) may have different numerologies, meaning that they may have different subcarrier spacing and/or slot lengths (e.g., 0.5 ms vs. 1 ms slot lengths). As such, the NRS transmitted on one carrier frequency may need to be muted to match the NRS transmitted on the other carrier frequency(ies). For example, if NRS signals are transmitted on one carrier frequency in 1 ms slots and on another carrier frequency in 0.5 ms slots, the second carrier frequency should be muted for the two slots corresponding to the one slot of the first carrier frequency.

In an aspect, if two carrier frequencies (or bandwidth paths or frequency layers) have different numerologies, the muting pattern can be defined in various ways to match the NRS transmissions of the carrier frequencies. For example, the muting pattern can be defined with respect to the (1) smallest numerology (i.e., whichever carrier frequency has the smallest subband spacing or shorted slot length), (2) the largest numerology (i.e., whichever carrier frequency has the largest subband spacing or longest slot length), (3) the numerology of the primary cell/carrier frequency, (4) some reference numerology, (5) the numerology of the carrier frequency on which the NRS is transmitted, (6) the numerology of the carrier frequency on which the on-demand muting trigger is sent, or (7) a numerology configured together with the on-demand muting pattern.

In an aspect, for a muting pattern triggered by DCI, there may be a minimum gap between the DCI carrying the muting trigger and the NRS transmission being muted. This minimum gap may depend on the capability of the UE, and can be equal to the minimum gap between the DCI and the PDSCH, the DCI and the PUSCH, the DCI and the CSI-RS, the DCI and the SRS, or the maximum between any of the above. The capability of the UE is the minimum of the above listed gaps that the UE can utilize.

In an aspect, the UE may be configured with different sets of parameters for the muting pattern, such as the number of NRS transmissions or the number of NRS occasions. The DCI may contain multiple bits to differentiate between the different sets of parameters.

In an aspect, there may be joint triggering of aperiodic NRS and aperiodic NRS muting patterns. A UE may be configured to be jointly triggered with an aperiodic NRS transmission from a cell/TRP and an aperiodic NRS muting from one or more other cells/TRPs. The UE may be configured with multiple such combinations, and the DCI bits can be used to specify which configuration to utilize.

In an aspect, a first TRP (e.g., the TRP serving the UE, or the TRP corresponding to the PCell for the UE) may send all the PRS and PRS muting configurations to the UE. The transmission of PRS (or non-transmission according to the muting configurations) may performed by a second TRP. The second TRP may be the same as or different from the first TRP.

It should be noted that although the foregoing has discussed muting patterns for NRS, the disclosure is equally applicable to other types of reference signals that can be used for positioning purposes, such as PRS in LTE, CRS, CSI-RS, DMRS, etc.

Figure 9:
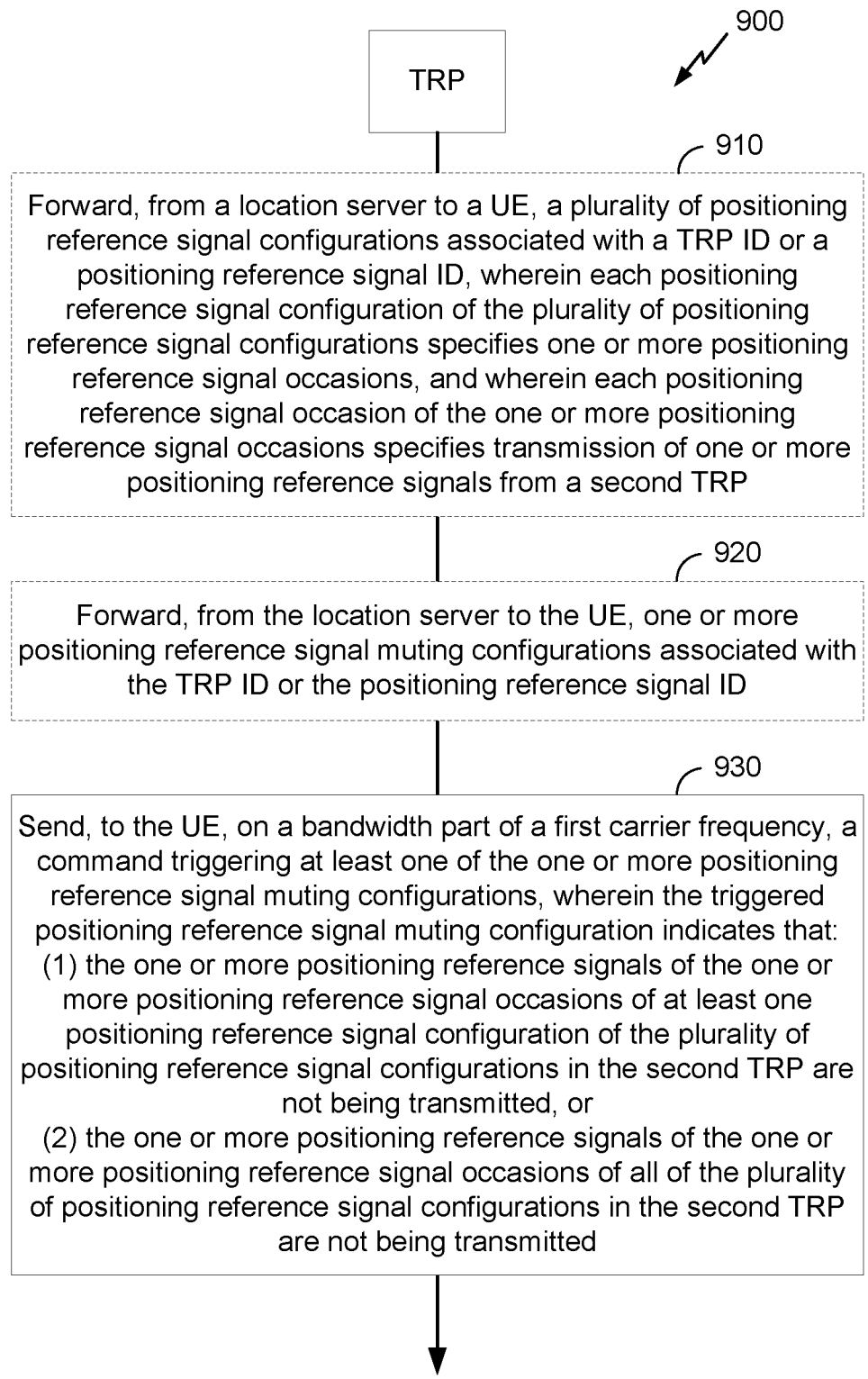
FIGS. 9 and 10 illustrate exemplary methods for on-demand muting of positioning reference signals according to various aspects.

FIG. 9 illustrates an exemplary method 900 for muting of positioning reference signals, according to aspects of the disclosure. In an aspect, the method 900 may be performed by a first cell or a first TRP of a base station (e.g., any of the base stations described herein).

At 910, the first TRP optionally forwards, from a location server (e.g., location server 230, LMF 270) to a UE (e.g., any of the UEs described herein), a plurality of positioning reference signal configurations associated with a TRP ID of the TRP or a positioning reference signal ID. Each positioning reference signal configuration of the plurality of positioning reference signal configurations may specify one or more positioning reference signal occasions. Each positioning reference signal occasion of the one or more positioning reference signal occasions may specify transmission of one or more positioning reference signals from a second TRP. Operation 910 is optional because a different TRP may forward the plurality of positioning reference signal configurations to the UE. Alternatively, the location server may be collocated with the first TRP. For example, the first TRP and the location server may be logically and/or physically separate components/modules of the same physical base station site. In an aspect, where the TRP is a TRP of a macro cell base station, operation 910 may be performed by licensed RAT communication device 352, communication controller 354, processing system 356, and/or memory component 358, any or all of which may be considered means for performing this operation. In an aspect, where the TRP is a TRP of a small cell base station, operation 910 may be performed by unlicensed RAT communication device 362, communication controller 364, processing system 366, and/or memory component 368, any or all of which may be considered means for performing this operation.

At 920, the first TRP optionally forwards, from a location server (e.g., location server 230, LMF 270) to the UE, one or more positioning reference signal muting configurations associated with the TRP ID or the positioning reference signal ID. Operation 920 is optional because a different TRP may forward the one or more positioning reference signal muting configurations to the UE. In an aspect, where the TRP is a TRP of a macro cell base station, operation 920 may be performed by licensed RAT communication device 352, communication controller 354, processing system 356, and/or memory component 358, any or all of which may be considered means for performing this operation. In an aspect, where the TRP is a TRP of a small cell base station, operation 920 may be performed by unlicensed RAT communication device 362, communication controller 364, processing system 366, and/or memory component 368, any or all of which may be considered means for performing this operation.

At 930, the first TRP sends, to the UE, on a bandwidth part of a first carrier frequency, a command triggering at least one of the one or more positioning reference signal muting configurations. The triggered positioning reference signal muting configuration may indicate that (1) the one or more positioning reference signals of the one or more positioning reference signal occasions of at least one positioning reference signal configuration of the plurality of positioning reference signal configurations of the second TRP are not being transmitted, or (2) the one or more positioning reference signals of the one or more positioning reference signal occasions of all of the plurality of positioning reference signal configurations of the second TRP are not being transmitted. In an aspect, where the TRP is a TRP of a macro cell base station, operation 930 may be performed by licensed RAT communication device 352, communication controller 354, processing system 356, and/or memory component 358, any or all of which may be considered means for performing this operation. In an aspect, where the TRP is a TRP of a small cell base station, operation 930 may be performed by unlicensed RAT communication device 362, communication controller 364, processing system 366, and/or memory component 368, any or all of which may be considered means for performing this operation.

In an aspect, the second TRP may mute positioning reference signals according to the triggered positioning reference signal muting configuration.

Figure 10:
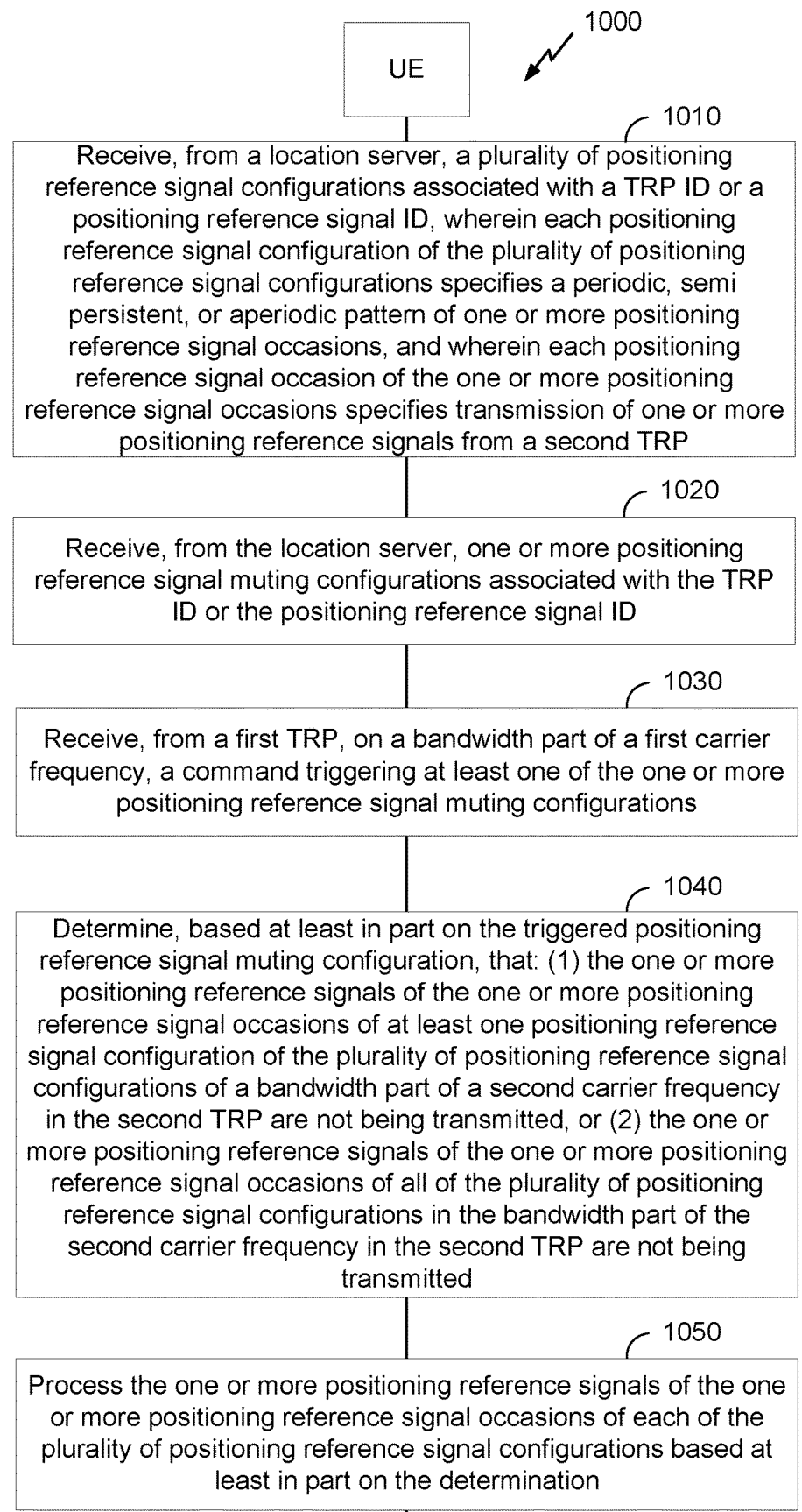

FIG. 10 illustrates an exemplary method 1000 for muting of positioning reference signals, according to aspects of the disclosure. In an aspect, the method 1000 may be performed by a UE (e.g., any of the UEs described herein).

At 1010, the UE receives, from a location server (e.g., location server 230, LMF 270), a plurality of positioning reference signal configurations associated with a TRP ID or a positioning reference signal ID. Each positioning reference signal configuration of the plurality of positioning reference signal configurations may specify a periodic, semi persistent, or aperiodic pattern of one or more positioning reference signal occasions. Each positioning reference signal occasion of the one or more positioning reference signal occasions may specify transmission of one or more positioning reference signals from a second TRP. In an aspect, operation 1010 may be performed by communication device 312, communication controller 314, processing system 316, memory component 318, and/or positioning module 324, any or all of which may be considered means for performing this operation.

At 1020, the UE receives, from the location server, one or more positioning reference signal muting configurations associated with the TRP ID or the positioning reference signal ID. In an aspect, operation 1020 may be performed by communication device 312, communication controller 314, processing system 316, memory component 318, and/or positioning module 324, any or all of which may be considered means for performing this operation.

At 1030, the UE receives, from a TRP of a base station (e.g., any of the base stations described herein), on a bandwidth part of a first carrier frequency, a command triggering at least one of the one or more positioning reference signal muting configurations. In an aspect, operation 1030 may be performed by communication device 312, communication controller 314, processing system 316, memory component 318, and/or positioning module 324, any or all of which may be considered means for performing this operation.

At 1040, the UE determines, based at least in part on the triggered positioning reference signal muting configuration, that: (1) the one or more positioning reference signals of the one or more positioning reference signal occasions of at least one positioning reference signal configuration of the plurality of positioning reference signal configurations of the second TRP are not being transmitted, or (2) the one or more positioning reference signals of the one or more positioning reference signal occasions of all of the plurality of positioning reference signal configurations in the bandwidth part of the second carrier frequency in the second TRP are not being transmitted. In an aspect, operation 1040 may be performed by communication controller 314, processing system 316, memory component 318, and/or positioning module 324, any or all of which may be considered means for performing this operation.

At 1050, the UE processes the one or more positioning reference signals of the one or more positioning reference signal occasions of each of the plurality of positioning reference signal configurations based at least in part on the determination. In an aspect, operation 1050 may be performed by communication controller 314, processing system 316, memory component 318, and/or positioning module 324, any or all of which may be considered means for performing this operation.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable read-only memory (EPROM), electronically erasable programmable read-only memory (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method as described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for muting of positioning reference signals performed by a first transmission-reception point (TRP), comprising:
   determining to send, to a user equipment (UE), a command triggering at least one of one or more positioning reference signal muting configurations associated with a TRP identifier (ID) and/or a positioning reference signal ID, wherein the triggered positioning reference signal muting configuration indicates that:
      one or more positioning reference signals of one or more positioning reference signal occasions of at least one positioning reference signal configuration of a plurality of positioning reference signal configurations of a second TRP are not being transmitted, the plurality of positioning reference signal configurations associated with the TRP ID and/or the positioning reference signal ID, or
      the one or more positioning reference signals of the one or more positioning reference signal occasions of all of the plurality of positioning reference signal configurations of the second TRP are not being transmitted,
   wherein the second TRP mutes the positioning reference signals according to the triggered positioning reference signal muting configuration, and based on a priority rule regarding a type of the triggered positioning reference signal muting configuration versus a type of the plurality of positioning reference signal configurations,
   wherein the command comprises a downlink control information (DCI) command or a medium access control (MAC) control element (CE) command,
   wherein the command is triggered based on a determination that there is an overlap between positioning reference signal occasions of the second TRP and the one or more positioning reference signal occasions of at least one of the plurality of positioning reference signal configurations, and
   wherein, based on the triggered positioning reference signal muting configuration being semi-persistent, the priority rule allows muting a positioning reference signal occasion of the second TRP that is periodic or semi-persistent, but omits muting any positioning reference signal occasion of the second TRP that is aperiodic.

2. The method of claim 1, wherein the command is sent on a bandwidth part of a first carrier frequency.

3. The method of claim 2, wherein the first TRP is the same as the second TRP, or the bandwidth part of the first carrier frequency is the same as a bandwidth part of a second carrier frequency, or the first carrier frequency is the same as the second carrier frequency.

4. The method of claim 1, wherein the DCI command comprises an uplink DCI, a downlink DCI, or a DCI format that triggers aperiodic positioning reference signal transmissions.

5. The method of claim 4, wherein the triggered positioning reference signal muting configuration is triggered jointly with a triggering of at least one positioning reference signal of the plurality of positioning reference signal configurations.

6. The method of claim 1, wherein a minimum gap exists between the DCI command and triggered positioning reference signal transmissions associated with the one or more positioning reference signal muting configurations.

7. The method of claim 6, wherein the minimum gap comprises a minimum gap between the DCI command and a physical downlink shared channel (PDSCH), the DCI command and a physical uplink shared channel (PUSCH), the DCI command and a channel state information reference signal (CSI-RS), or the DCI command and a sounding reference signal (SRS).

8. The method of claim 1, wherein the triggered positioning reference signal muting configuration is partially muted in a frequency domain of positioning reference signals of the one or more positioning reference signal occasions.

9. The method of claim 1, wherein a numerology of the one or more positioning reference signal muting configurations is derived at least based on a numerology of the second TRP, a numerology of the first TRP, a numerology of the positioning reference signal occasions of the second TRP, an explicitly configured numerology related to the one or more positioning reference signal muting configurations, or any combination thereof.

10. The method of claim 9, wherein the numerology of the one or more positioning reference signal muting configurations is the smallest or the largest of the numerology of the first TRP and the numerology of the second TRP, or between a numerology used to trigger the one or more positioning reference signal muting configurations and a numerology used in the positioning reference signal occasions of the second TRP.

11. The method of claim 1, wherein:
   based on the triggered positioning reference signal muting configuration being aperiodic, the priority rule allows muting a positioning reference signal occasion of the second TRP that is aperiodic, semi-persistent, or periodic.

12. The method of claim 1, wherein:
   based on the triggered positioning reference signal muting configuration being periodic, the priority rule allows muting a positioning reference signal occasion of the second TRP that is periodic, but omits muting any positioning reference signal occasion of the second TRP that is aperiodic or semi-persistent.

13. The method of claim 1, further comprising:
   receiving, from the UE, a request to send the command triggering the at least one of the one or more positioning reference signal muting configurations.

14. The method of claim 1, further comprising:
forwarding, from a location server to the UE, the plurality of positioning reference signal configurations associated with the TRP ID and/or the positioning reference signal ID; and
forwarding, from the location server to the UE, the one or more positioning reference signal muting configurations associated with the TRP ID and/or the positioning reference signal ID.

15. The method of claim 14, wherein each positioning reference signal occasion included in the plurality of positioning reference signal configurations corresponds to respective positioning reference signal transmission from the second TRP.

16. The method of claim 14, wherein the location server is collocated with the first TRP.

17. The method of claim 1, wherein the plurality of positioning reference signals comprise positioning reference signaling (PRS) signals, navigation reference signaling (NRS) signals, demodulation reference signals (DMRS), cell-specific reference signals (CRS), tracking reference signals (TRS), channel state information reference signals (CSI-RS), primary synchronization signals (PSS), or secondary synchronization signals (SSS).

18. A first transmission-reception point (TRP), comprising:
a memory;
a transceiver; and
at least one processor coupled with the memory and the transceiver and configured to:
determine to send, via the transceiver to a user equipment (UE), a command triggering at least one of one or more positioning reference signal muting configurations associated with a TRP identifier (ID) and/or a positioning reference signal ID, wherein the triggered positioning reference signal muting configuration indicates that:
one or more positioning reference signals of one or more positioning reference signal occasions of at least one positioning reference signal configuration of a plurality of positioning reference signal configurations of a second TRP are not being transmitted, the plurality of positioning reference signal configurations associated with the TRP ID and/or the positioning reference signal ID, or
the one or more positioning reference signals of the one or more positioning reference signal occasions of all of the plurality of positioning reference signal configurations of the second TRP are not being transmitted,
wherein the second TRP mutes the positioning reference signals according to the triggered positioning reference signal muting configuration, and based on a priority rule regarding a type of the triggered positioning reference signal muting configuration versus a type of the plurality of positioning reference signal configurations,
wherein the command comprises a downlink control information (DCI) command or a medium access control (MAC) control element (CE) command,
wherein the command is triggered based on a determination that there is an overlap between positioning reference signal occasions of the second TRP and the one or more positioning reference signal occasions of at least one of the plurality of positioning reference signal configurations, and
wherein, based on the triggered positioning reference signal muting configuration being semi-persistent, the priority rule allows muting a positioning reference signal occasion of the second TRP that is periodic or semi-persistent, but omits muting any positioning reference signal occasion of the second TRP that is aperiodic.

19. The first TRP of claim 18, wherein the command is sent on a bandwidth part of a first carrier frequency.

20. The first TRP of claim 19, wherein the first TRP is the same as the second TRP, or the bandwidth part of the first carrier frequency is the same as a bandwidth part of a second carrier frequency, or the first carrier frequency is the same as the second carrier frequency.

21. The first TRP of claim 18, wherein the DCI command comprises an uplink DCI, a downlink DCI, or a DCI format that triggers aperiodic positioning reference signal transmissions.

22. The first TRP of claim 21, wherein the triggered positioning reference signal muting configuration is triggered jointly with a triggering of at least one positioning reference signal of the plurality of positioning reference signal configurations.

23. The first TRP of claim 18, wherein a minimum gap exists between the DCI command and triggered positioning reference signal transmissions associated with the one or more positioning reference signal muting configurations.

24. The first TRP of claim 23, wherein the minimum gap comprises a minimum gap between the DCI command and a physical downlink shared channel (PDSCH), the DCI command and a physical uplink shared channel (PUSCH), the DCI command and a channel state information reference signal (CSI-RS), or the DCI command and a sounding reference signal (SRS).

25. The first TRP of claim 18, wherein the triggered positioning reference signal muting configuration is partially muted in a frequency domain of positioning reference signals of the one or more positioning reference signal occasions.

26. The first TRP of claim 18, wherein a numerology of the one or more positioning reference signal muting configurations is derived at least based on a numerology of the second TRP, a numerology of the first TRP, a numerology of the positioning reference signal occasions of the second TRP, an explicitly configured numerology related to the one or more positioning reference signal muting configurations, or any combination thereof.

27. The first TRP of claim 26, wherein the numerology of the one or more positioning reference signal muting configurations is the smallest or the largest of the numerology of the first TRP and the numerology of the second TRP, or between a numerology used to trigger the one or more positioning reference signal muting configurations and a numerology used in the positioning reference signal occasions of the second TRP.

28. The first TRP of claim 18, wherein:
based on the triggered positioning reference signal muting configuration being aperiodic, the priority rule allows muting a positioning reference signal occasion of the second TRP that is aperiodic, semi-persistent, or periodic.

29. The first TRP of claim 18, wherein:
based on the triggered positioning reference signal muting configuration being periodic, the priority rule allows muting a positioning reference signal occasion of the second TRP that is periodic, but omits muting any positioning reference signal occasion of the second TRP that is aperiodic or semi-persistent.

30. The first TRP of claim 18, wherein the at least one processor is further configured to:
  receive, via the transceiver from the UE, a request to send the command triggering the at least one of the one or more positioning reference signal muting configurations.

31. The first TRP of claim 18, wherein the at least one processor is further configured to:
  forward, via the transceiver from a location server to the UE, the plurality of positioning reference signal configurations associated with the TRP ID and/or the positioning reference signal ID; and
  forward, via the transceiver from the location server to the UE, the one or more positioning reference signal muting configurations associated with the TRP ID and/or the positioning reference signal ID.

32. The first TRP of claim 31, wherein each positioning reference signal occasion included in the plurality of positioning reference signal configurations corresponds to respective positioning reference signal transmission from the second TRP.

33. The first TRP of claim 31, wherein the location server is collocated with the first TRP.

34. The first TRP of claim 18, wherein the plurality of positioning reference signals comprise positioning reference signaling (PRS) signals, navigation reference signaling (NRS) signals, demodulation reference signals (DMRS), cell-specific reference signals (CRS), tracking reference signals (TRS), channel state information reference signals (CSI-RS), primary synchronization signals (PSS), or secondary synchronization signals (SSS).

35. A first transmission-reception point (TRP), comprising:
  means for determining to send, to a user equipment (UE), a command triggering at least one of one or more positioning reference signal muting configurations associated with a TRP identifier (ID) and/or a positioning reference signal ID, wherein the triggered positioning reference signal muting configuration indicates that:
    one or more positioning reference signals of one or more positioning reference signal occasions of at least one positioning reference signal configuration of a plurality of positioning reference signal configurations of a second TRP are not being transmitted, the plurality of positioning reference signal configurations associated with the TRP ID and/or the positioning reference signal ID, or
    the one or more positioning reference signals of the one or more positioning reference signal occasions of all of the plurality of positioning reference signal configurations of the second TRP are not being transmitted, wherein the second TRP mutes the positioning reference signals according to the triggered positioning reference signal muting configuration, and based on a priority rule regarding a type of the triggered positioning reference signal muting configuration versus a type of the plurality of positioning reference signal configurations,
  wherein the command comprises a downlink control information (DCI) command or a medium access control (MAC) control element (CE) command,
  means for triggering the command based on a determination that there is an overlap between positioning reference signal occasions of the second TRP and the one or more positioning reference signal occasions of at least one of the plurality of positioning reference signal configurations, and
  wherein, based on the triggered positioning reference signal muting configuration being semi-persistent, the priority rule allows muting a positioning reference signal occasion of the second TRP that is periodic or semi-persistent, but omits muting any positioning reference signal occasion of the second TRP that is aperiodic.

36. A non-transitory computer-readable medium storing computer-executable instructions that, when executed by a processing device, cause the processing device to:
  determine to send, to a user equipment (UE), a command triggering at least one of one or more positioning reference signal muting configurations associated with a TRP identifier (ID) and/or a positioning reference signal ID, wherein the triggered positioning reference signal muting configuration indicates that:
    one or more positioning reference signals of one or more positioning reference signal occasions of at least one positioning reference signal configuration of a plurality of positioning reference signal configurations of a second TRP are not being transmitted, the plurality of positioning reference signal configurations associated with the TRP ID and/or the positioning reference signal ID, or
    the one or more positioning reference signals of the one or more positioning reference signal occasions of all of the plurality of positioning reference signal configurations of the second TRP are not being transmitted,
  wherein the second TRP mutes the positioning reference signals according to the triggered positioning reference signal muting configuration, and based on a priority rule regarding a type of the triggered positioning reference signal muting configuration versus a type of the plurality of positioning reference signal configurations,
  wherein the command comprises a downlink control information (DCI) command or a medium access control (MAC) control element (CE) command,
  wherein the command is triggered based on a determination that there is an overlap between positioning reference signal occasions of the second TRP and the one or more positioning reference signal occasions of at least one of the plurality of positioning reference signal configurations, and
  wherein, based on the triggered positioning reference signal muting configuration being semi-persistent, the priority rule allows muting a positioning reference signal occasion of the second TRP that is periodic or semi-persistent, but omits muting any positioning reference signal occasion of the second TRP that is aperiodic.

\* \* \* \* \*